US012724245B2

(12) United States Patent
Ichimura

(10) Patent No.: US 12,724,245 B2
(45) Date of Patent: Sep. 1, 2026

(54) COMPOSITE OPTICAL ELEMENT AND OPTICAL SYSTEM INCLUDING THE SAME

(71) Applicant: CANON KABUSHIKI KAISHA, Tokyo (JP)

(72) Inventor: Junya Ichimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 18/461,380

(22) Filed: Sep. 5, 2023

(65) Prior Publication Data

US 2024/0094514 A1 Mar. 21, 2024

(30) Foreign Application Priority Data

Sep. 9, 2022 (JP) ................................ 2022-143624

(51) Int. Cl.

*G02B 13/00* (2006.01)
*G02B 1/04* (2006.01)
*G02B 15/14* (2006.01)

(52) U.S. Cl.

CPC ........... *G02B 13/006* (2013.01); *G02B 1/041* (2013.01); *G02B 13/0045* (2013.01); *G02B 15/144107* (2019.08); *G02B 15/144511* (2019.08); *G02B 15/145121* (2019.08); *G02B 15/1461* (2019.08); *G02B 15/1465* (2019.08)

(58) Field of Classification Search

CPC .............. G02B 13/006; G02B 13/0045; G02B 13/002; G02B 13/18; G02B 1/041; G02B 3/02; G02B 15/14

USPC ....... 359/655, 708, 796, 718, 754, 755, 776, 359/781, 772, 766

See application file for complete search history.

(56) References Cited

U.S. PATENT DOCUMENTS

| | | | | |
|---|---|---|---|---|
| 7,236,302 | B2 * | 6/2007 | Nakai | G02B 27/4277 359/569 |
| 7,864,453 | B2 * | 1/2011 | Maetaki | G02B 7/008 359/676 |
| 2012/0134028 | A1 * | 5/2012 | Maruyama | H10F 39/8063 359/601 |
| 2019/0119442 | A1 * | 4/2019 | Hirakawa | C08G 64/307 |
| 2019/0187409 | A1 | 6/2019 | Noda | |
| 2020/0310090 | A1 | 10/2020 | Tanaka | |
| 2020/0341249 | A1 * | 10/2020 | Ito | G02B 15/145113 |
| 2021/0055530 | A1 * | 2/2021 | Miwa | G02B 27/4205 |
| 2022/0026693 | A1 | 1/2022 | Kawana | |
| 2022/0113522 | A1 * | 4/2022 | Ichimura | G02B 13/02 |
| 2025/0050601 | A1 * | 2/2025 | Miyamoto | G02B 13/04 |

FOREIGN PATENT DOCUMENTS

| | | | |
|---|---|---|---|
| JP | H05254862 | A | 10/1993 |
| JP | H11064607 | A | 3/1999 |
| JP | 2009047986 | A | 3/2009 |
| JP | 2009102539 | A | 5/2009 |

(Continued)

*Primary Examiner* — Bumsuk Won
*Assistant Examiner* — Seth D Moser
(74) *Attorney, Agent, or Firm* — Canon U.S.A., Inc. IP Division

(57) ABSTRACT

A composite optical element includes a glass lens and a resin lens that are joined together. The resin lens has an aspheric shape. When Nd is a refractive index of the resin lens, νd is an Abbe number of the resin lens, and θgF is a partial dispersion ratio of the resin lens, Nd, νd, and θgF are appropriately set.

7 Claims, 13 Drawing Sheets

(56) References Cited

FOREIGN PATENT DOCUMENTS

| | | | |
|---|---|---|---|
| JP | 2009271166 | A | 11/2009 |
| JP | 2011001395 | A | 1/2011 |
| JP | 2018194772 | A | 12/2018 |
| JP | 2020132760 | A | 8/2020 |

* cited by examiner

L0
IP
L41
L31
L25
L24
L23
L22
L21
PL1
STO
PL3
HB3
HB2
B4(+)
B3(-)
B2(+)
INFINITY
CLOSE-UP
L13
L12
L11
PL2
HB1
B1(-)

L0
IP
L71
L61
PL32
HB3
L52
L51
L44
L43
L42
L41
L36
L35
L34
L33
L32
L31
HB2
PL1
STO
L24
L23
L22
L21
PL31
HB1
L13
L12
L11
B7(+)
B6(−)
B5(−)
B4(+)
B3(+)
B1(+)
CLOSE-UP
INFINITY

L0
IP
L71
L61
PL12
L51
L42
L41
L33
L32
STO
L31
L21
PL11
HB4
HB3
PL32
HB2
B7(+)
B6(−)
B5(+)
B4(−)
B3(+)
B2(+)
INFINITY
CLOSE-UP
L14
L13
L12
L11
HB1
PL31
B1(−)

COMPOSITE OPTICAL ELEMENT AND OPTICAL SYSTEM INCLUDING THE SAME

BACKGROUND OF THE INVENTION

Field of the Invention

The present invention relates to an optical system, and is suitable for application to imaging apparatuses, such as a digital video camera, a digital still camera, a broadcast camera, and a silver-halide film camera.

Description of the Related Art

In recent years, image-capturing optical systems having a shorter overall length and a reduced weight have been desired. The overall length and weight of an image-capturing optical system can be reduced by increasing the refractive power of each lens and using an aspheric lens to correct aberrations generated as a result.

The aspheric lens for the image-capturing optical system may be, for example, a composite element including a glass lens and a resin layer formed on the glass lens.

The composite element allows a high degree of flexibility regarding the glass material of the glass lens and is easy to form, and therefore can be easily applied to the image-capturing optical system.

Japanese Patent Laid-Open No. 2009-047986 describes an optical system including a composite lens in which glass composed of a material having a low partial dispersion ratio is combined with a resin having a high partial dispersion ratio to correct chromatic aberration. However, when an aspheric lens is formed of the resin having a high partial dispersion ratio, chromatic spherical aberration and chromatic field curvature are increased.

SUMMARY OF THE INVENTION

An optical system according to the present invention includes a composite optical element including a glass lens and a resin lens that are joined together. The resin lens has an aspheric shape. When Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900$$

Further features of the present invention will become apparent from the following description of embodiments with reference to the attached drawings.

DESCRIPTION OF THE EMBODIMENTS

Optical systems according to embodiments of the present invention and imaging apparatuses including the optical systems will be described with reference to the accompanying drawings.

FIGS. 1, 3, 5, 7, 9, and 11 are sectional views of optical systems L0 according to first to sixth embodiments. The optical system L0 of each embodiment is an optical system included in an imaging apparatus, such as a digital video camera, a digital still camera, a broadcast camera, a silver-halide film camera, a monitoring camera, or an on-vehicle camera.

In each sectional view of the lenses, the left side is the object side and the right side is the image side. The optical system L0 of each embodiment may be used as a projection lens of a projector or the like. In such a case, a screen is on the left side and a projection image is on the right side.

The optical system L0 of each embodiment includes one or more composite optical elements (HB1, HB2, HB3, and HB4) formed by joining a resin lens PL to a glass lens L. Each of the composite optical elements HB1, HB2, HB3, and HB4 may be composed of one glass lens L and one resin lens PL, or be composed of one or more glass lenses L and one or more resin lenses PL.

In the sectional views of the lenses, the solid-line arrows show loci of movement of lens units during zooming from the wide-angle end to the telephoto end. The lens units move as shown by the dotted-line arrows during focusing from infinity to a close distance.

In each sectional view of the lenses, STO denotes an aperture stop, and IP denotes an image plane. When the optical system of each embodiment is included in a digital still camera or a digital video camera, an imaging plane of a solid-state image pickup device (photoelectric transducer), such as a CCD sensor or a CMOS sensor, is disposed on the image plane IP. When the optical system of each embodiment is used as an image-capturing optical system of a silver-halide film camera, a photosensitive surface, which corresponds to a film surface, is placed on the image plane IP.

FIGS. 2A, 4A, 8A, and 10A and FIGS. 2B, 4B, 8B, and 10B show aberration diagrams of the optical systems according to the first, second, fourth, and fifth embodiments at the wide-angle end and the telephoto end, respectively, when an object at infinity is in focus.

Figure 1:
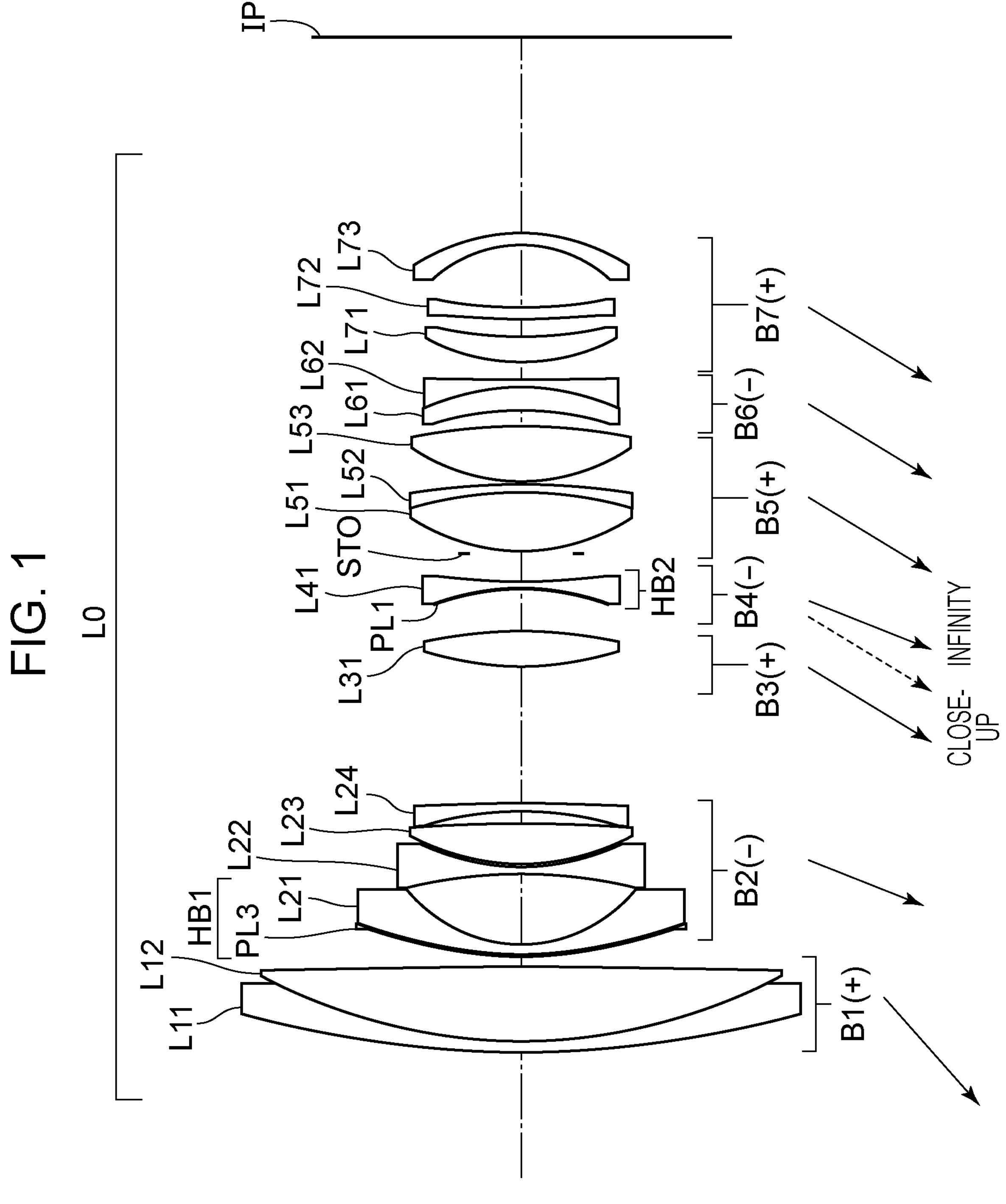
FIG. 1 is a sectional view of lenses of an optical system according to a first embodiment at the wide-angle end.
Figure 2A:
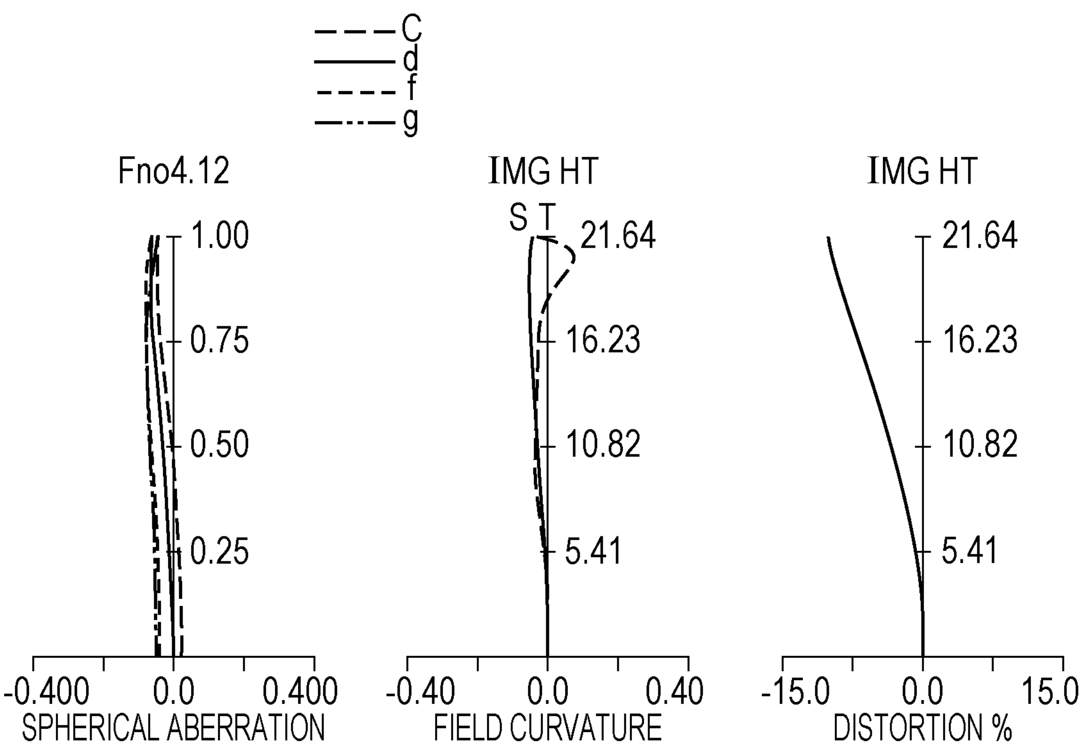
FIGS. 2A and 2B show aberration diagrams of the optical system according to the first embodiment at the wide-angle end and the telephoto end, respectively.
Figure 2A:
Figure 2B:
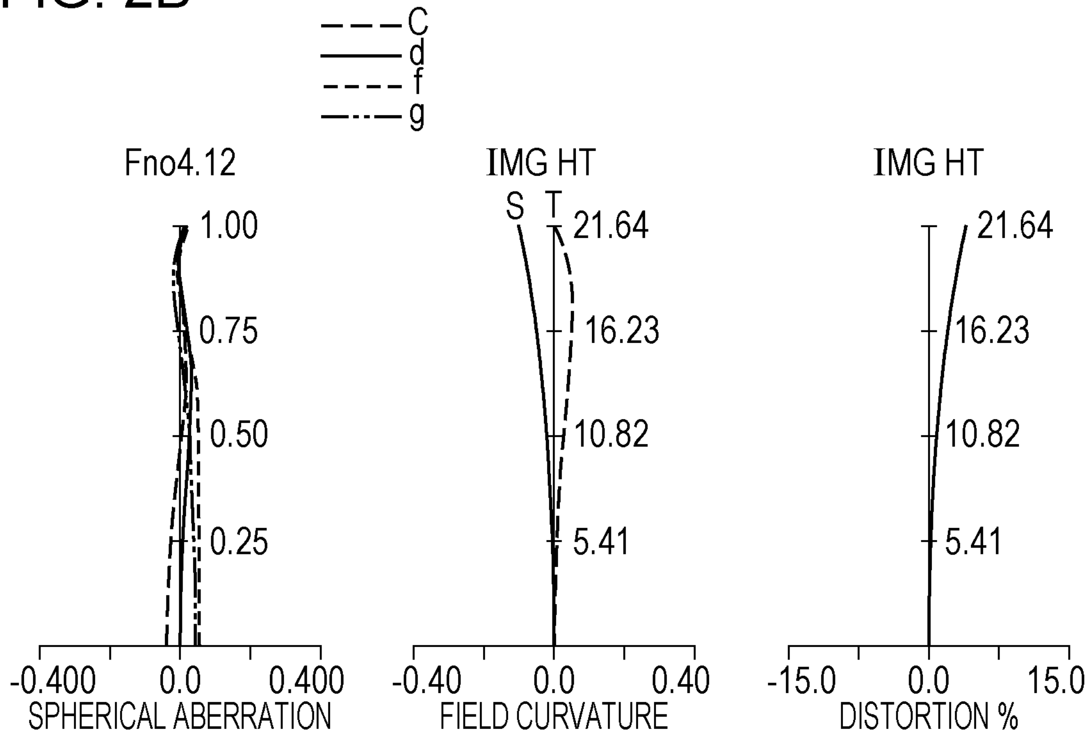
Figure 3:
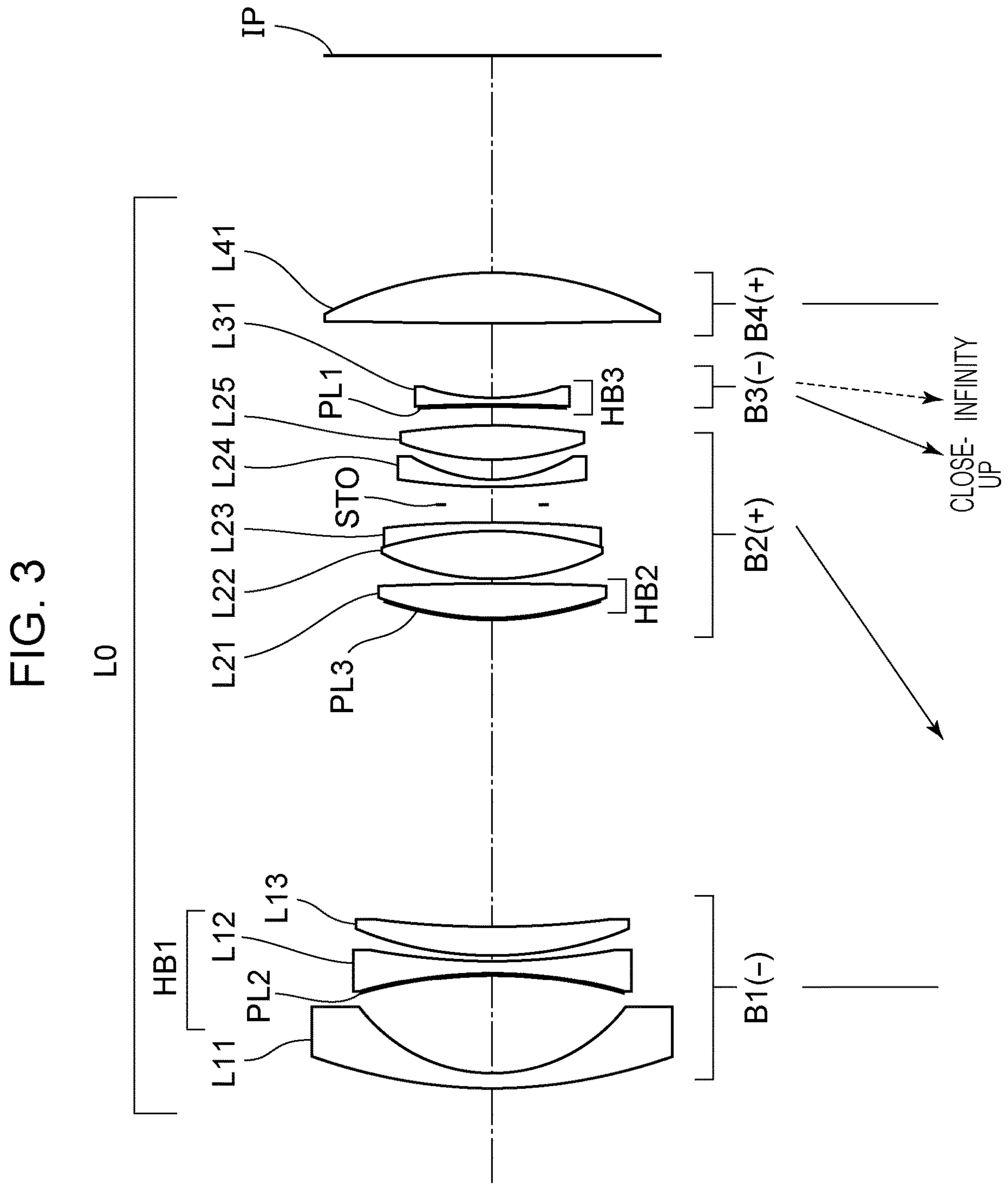
FIG. 3 is a sectional view of lenses of an optical system according to a second embodiment at the wide-angle end.
Figure 4A:
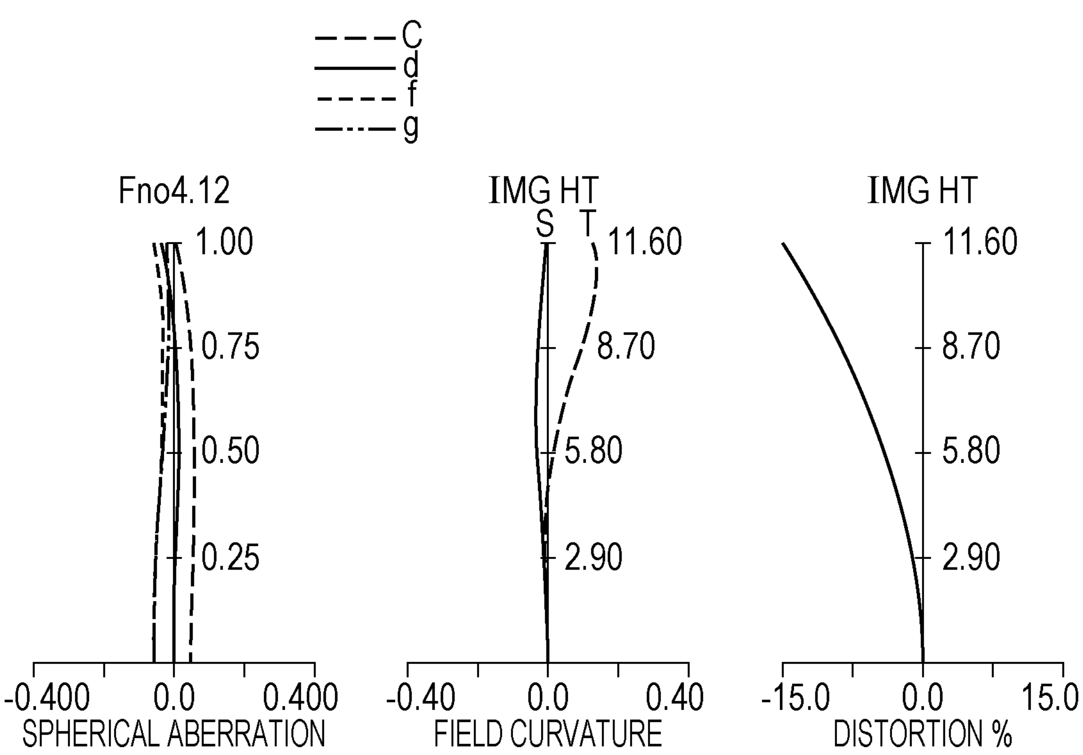
FIGS. 4A and 4B show aberration diagrams of the optical system according to the second embodiment at the wide-angle end and the telephoto end, respectively.
Figure 4B:
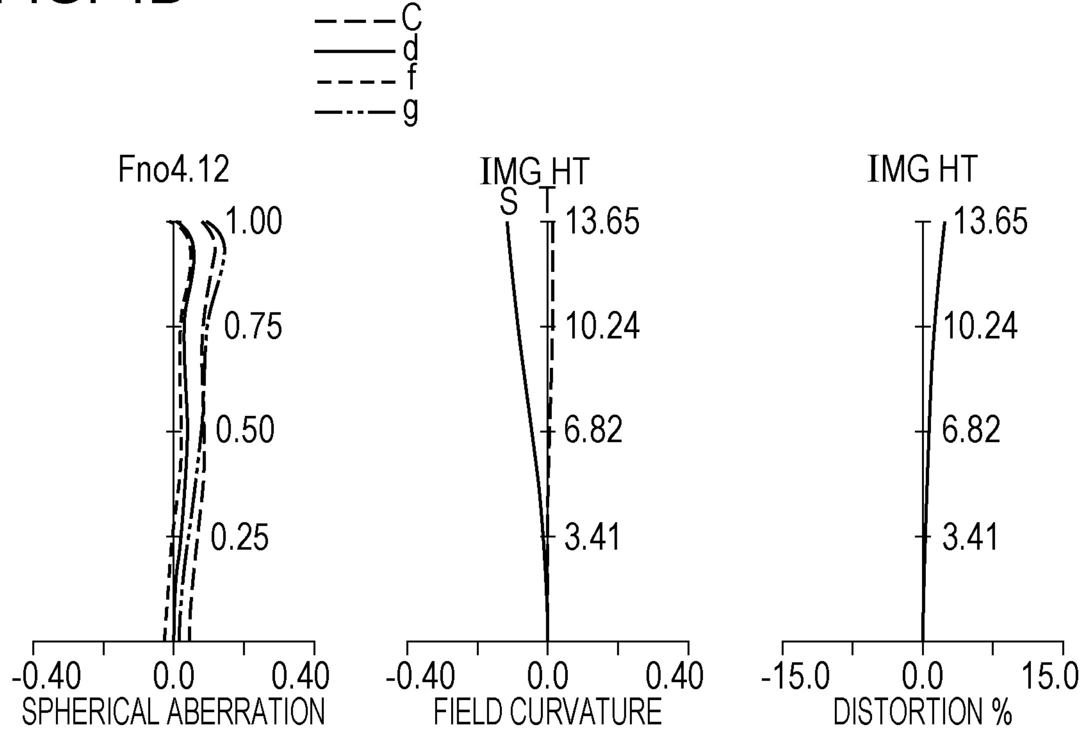
Figure 5:
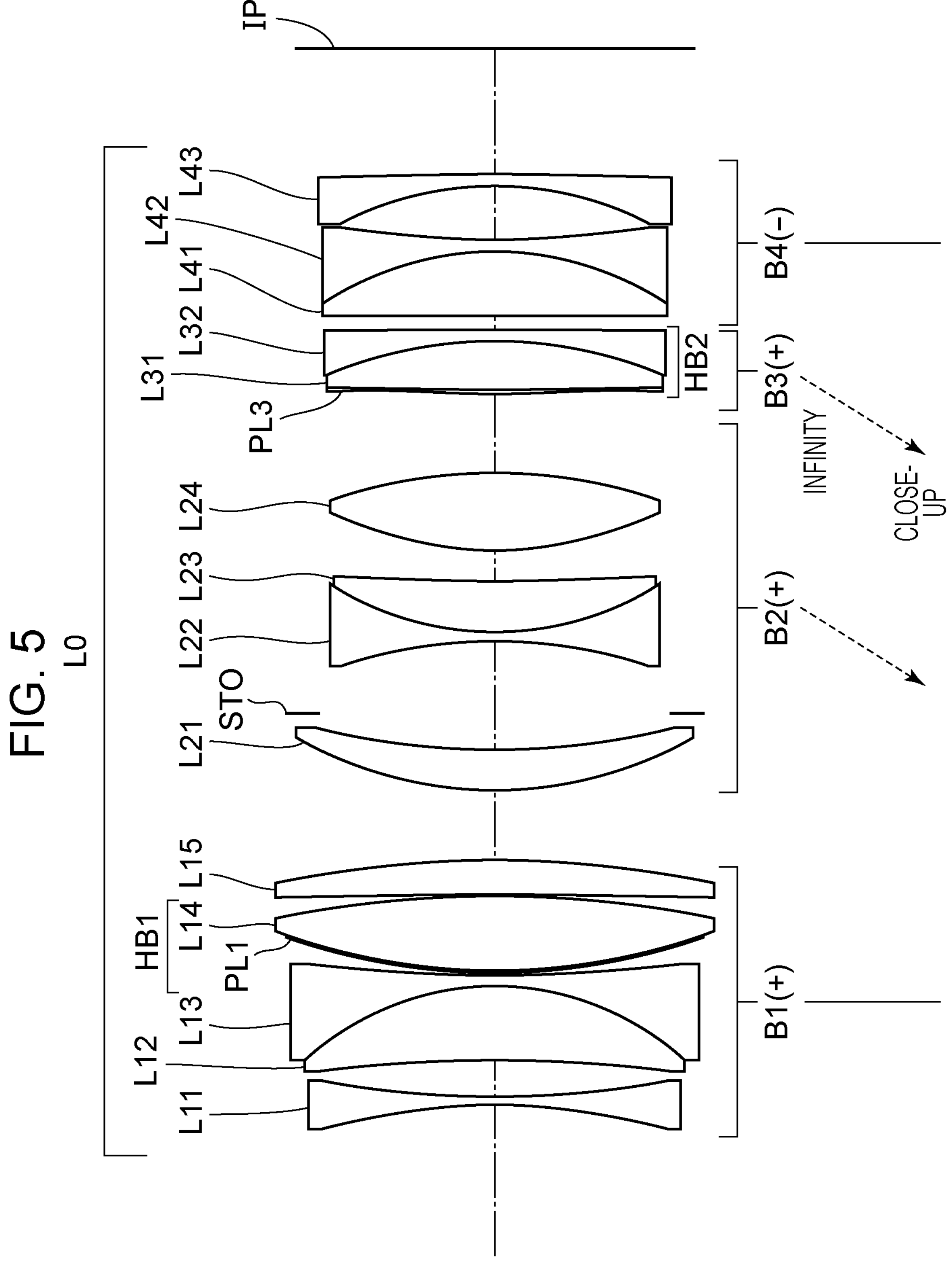
FIG. 5 is a sectional view of lenses of an optical system according to a third embodiment.
Figure 6:
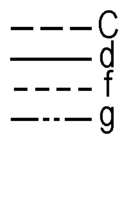
FIG. 6 show aberration diagrams of the optical system according to the third embodiment.
Figure 6:
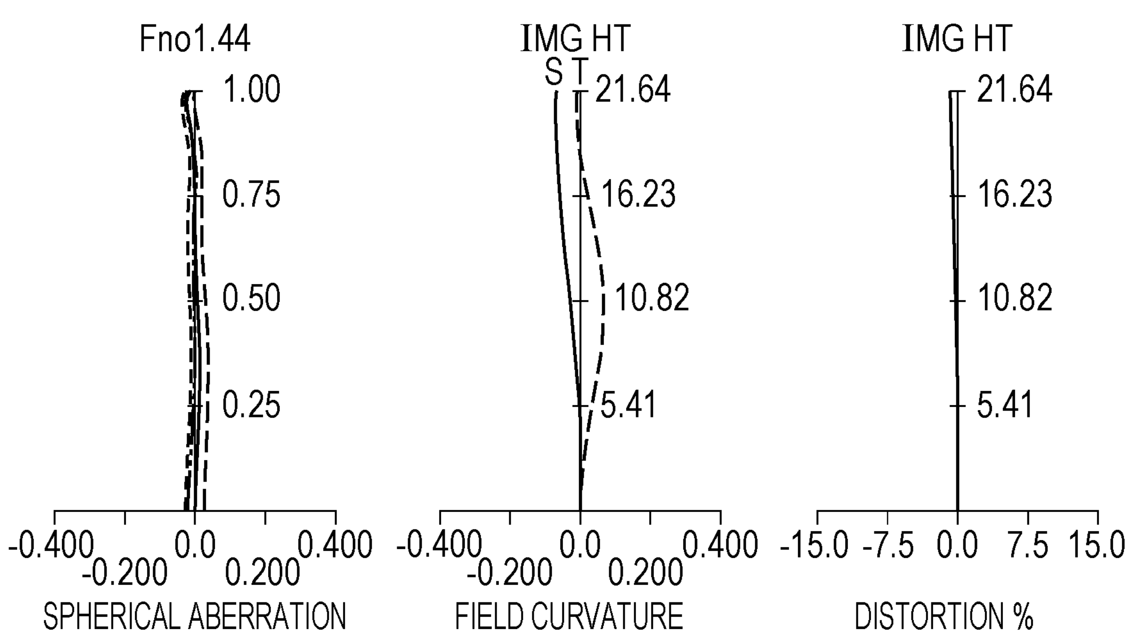
Figure 7:
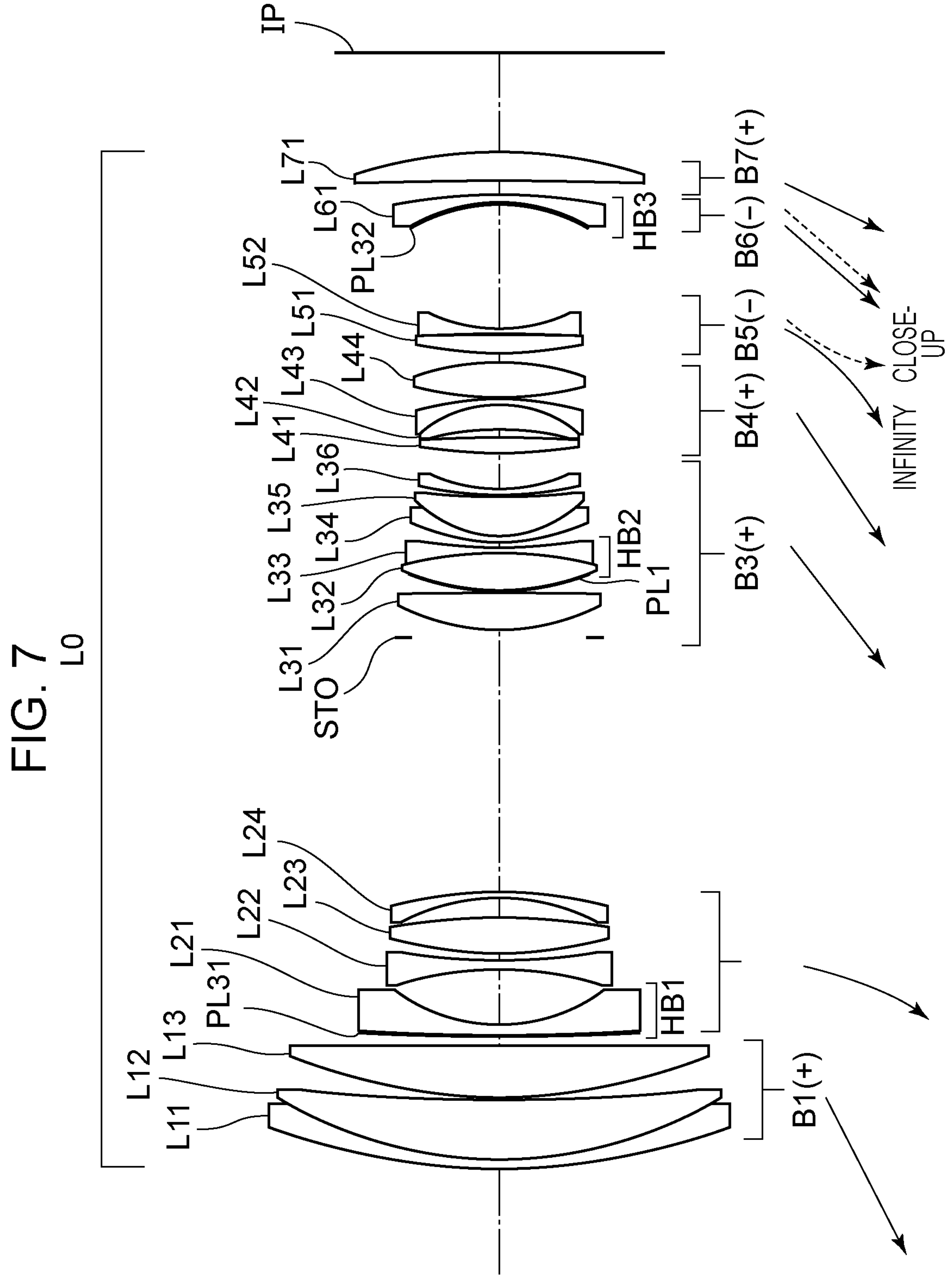
FIG. 7 is a sectional view of lenses of an optical system according to a fourth embodiment at the wide-angle end.
Figure 8A:
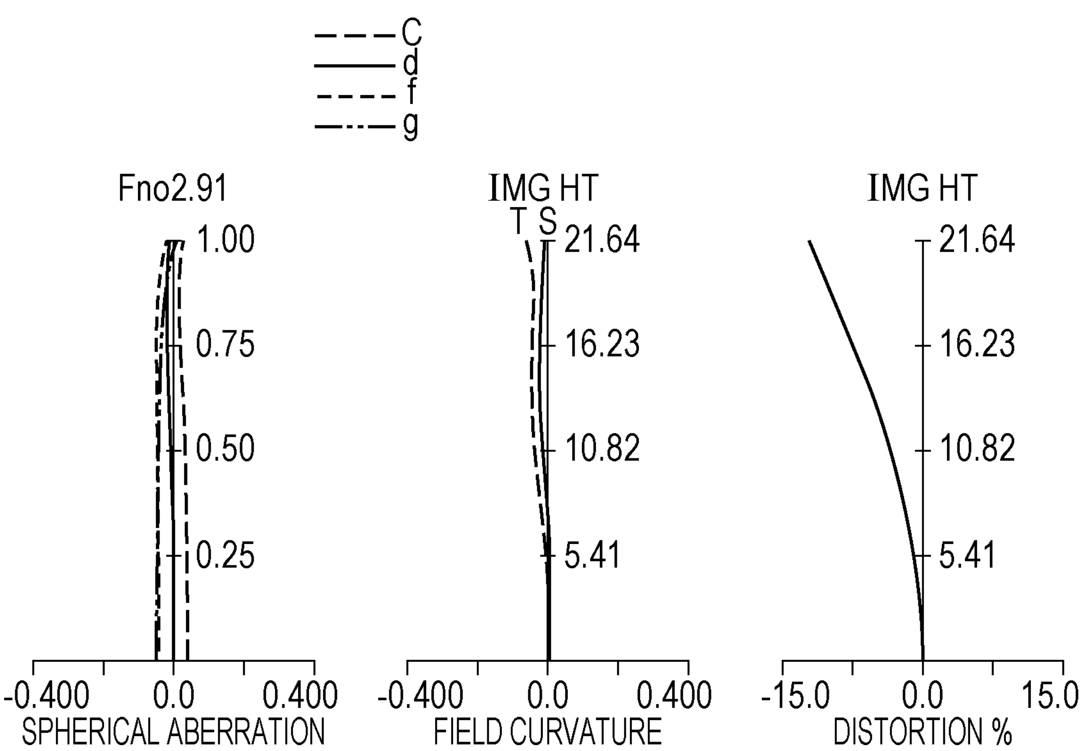
FIGS. 8A and 8B show aberration diagrams of the optical system according to the fourth embodiment at the wide-angle end and the telephoto end, respectively.
Figure 8B:
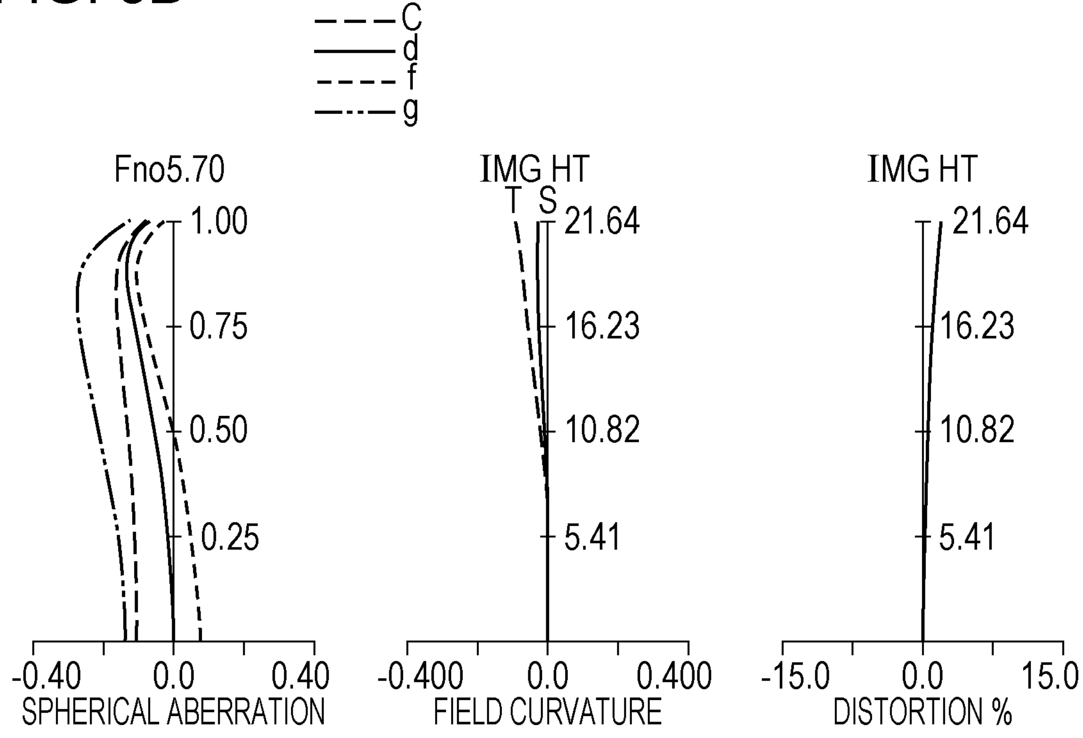
Figure 9:
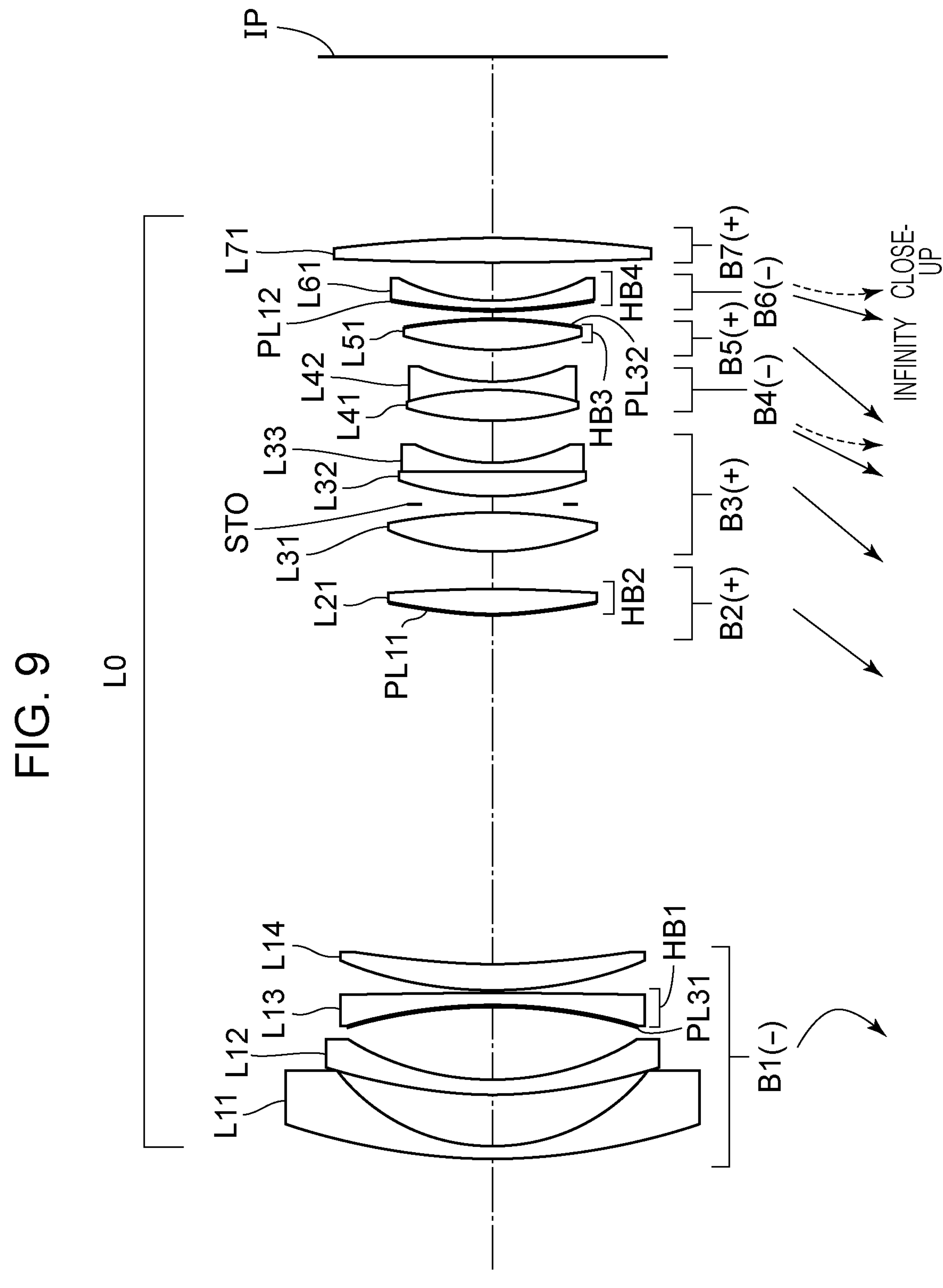
FIG. 9 is a sectional view of lenses of an optical system according to a fifth embodiment at the wide-angle end.
Figure 10A:
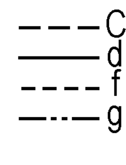
FIGS. 10A and 10B show aberration diagrams of the optical system according to the fifth embodiment at the wide-angle end and the telephoto end, respectively.
Figure 10A:
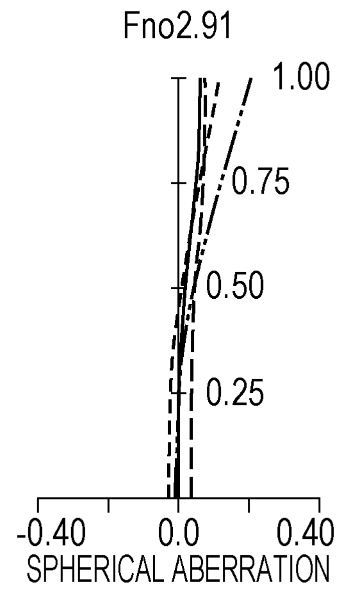
Figure 10A:
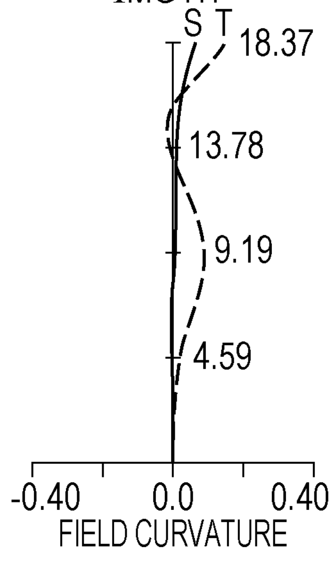
Figure 10A:
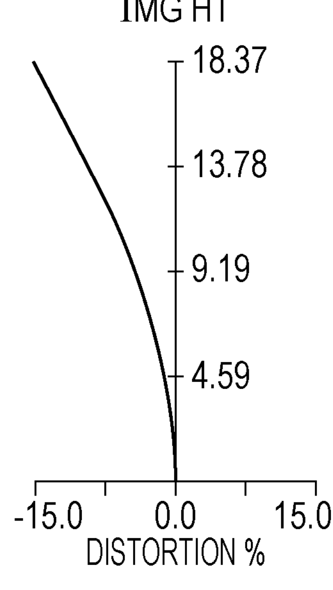
Figure 10B:
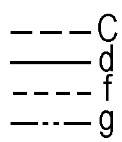
Figure 10B:
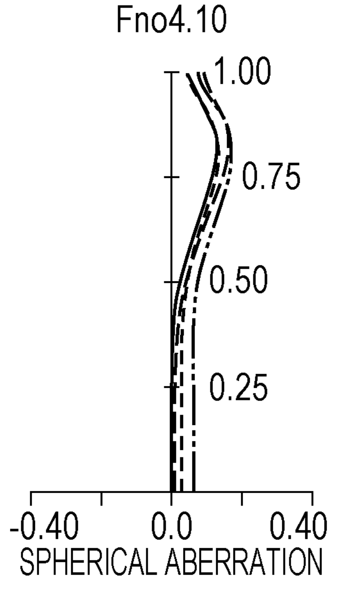
Figure 10B:
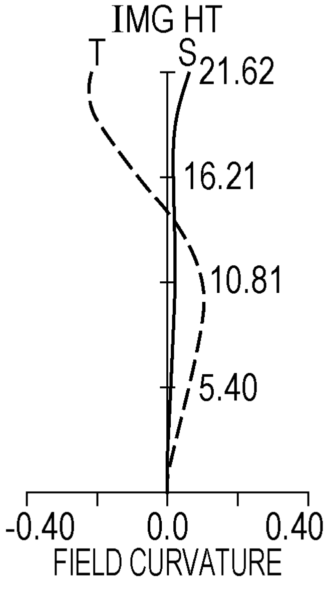
Figure 10B:
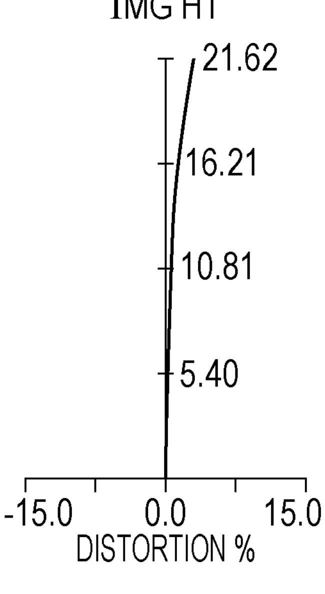
Figure 11:
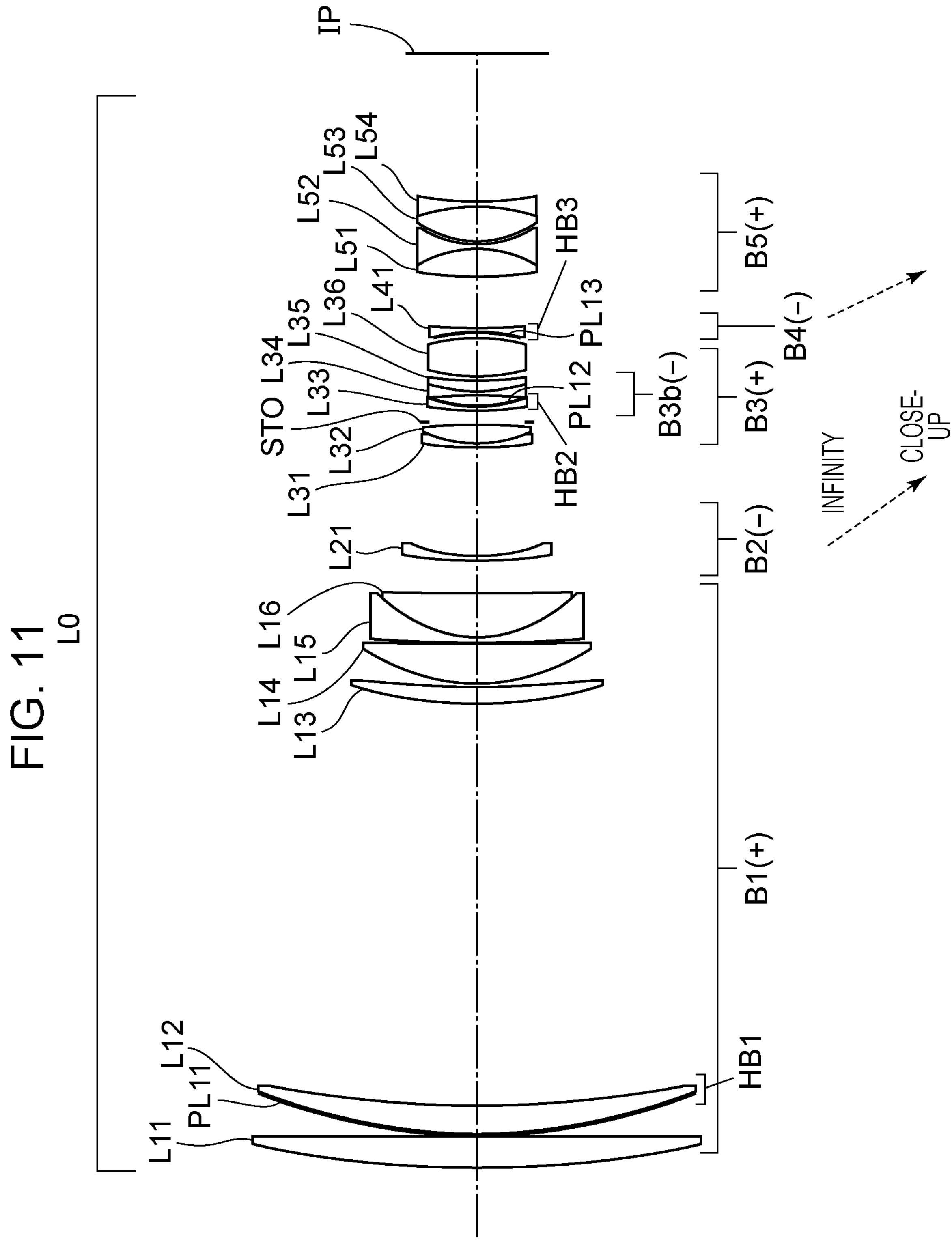
FIG. 11 is a sectional view of lenses of an optical system according to a sixth embodiment.
Figure 12:
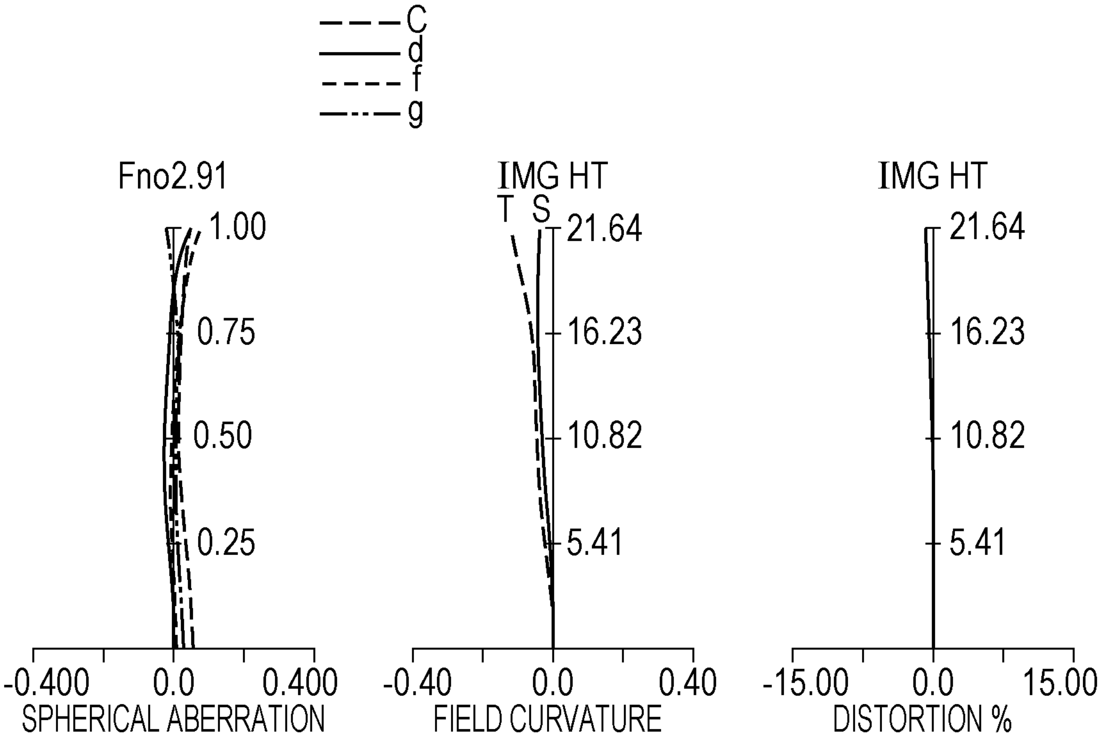
FIG. 12 show aberration diagrams of the optical system according to the sixth embodiment.

FIGS. 6 and 12 show aberration diagrams of the optical systems according to the third embodiment and the sixth embodiment, respectively, when an object at infinity is in focus.

In the spherical aberration diagrams, Fno is the F-number, and the amounts of spherical aberrations with respect to the d-line (wavelength 587.6 nm) and the g-line (wavelength 435.8 nm) are shown. In the astigmatism diagrams, S is the amount of aberration on the sagittal image plane, and T is the amount of aberration on the meridional image plane. The distortion diagrams show the amounts of distortions with respect to the d-line. In addition, ω is the imaging half angle of view (°).

Characteristic structures of the optical systems according to the embodiments will now be described.

Each embodiment includes one or more composite optical elements (HB1, HB2, HB3, and HB4) obtained by joining a resin lens PL having an aspheric shape to a glass lens L. Each of the composite optical elements HB1, HB2, HB3, and HB4 is configured to satisfy the following inequalities:

$$1.900<Nd+(0.014\times\nu d)<2.045 \quad (1)$$

$$30.0<\nu d<35.0 \quad (2)$$

$$0.6200<\theta gF+(0.0024\times\nu d)<0.6900 \quad (3)$$

Here, Nd is the refractive index of the resin lens PL, νd is the Abbe number of the resin lens PL, and θgF is the partial dispersion ratio of the resin lens PL.

Nd is the refractive index at the d-line (587.6 nm). When Nd, NF, and NC are the refractive indices at the d-line (wavelength 587.6 nm), the F-line (486.1 nm), and the C-line (656.3 nm), respectively, the Abbe number νd is expressed as follows:

$$\nu d=(Nd-1)/(NF-NC)$$

Inequality (1) defines a range of the refractive index of the resin lens PL. When the value of Inequality (1) is below the lower limit, the refractive index of the resin lens PL is too low, and the difference between the thickness of the resin lens PL along the optical axis and the thickness of the resin lens PL in the direction of the optical axis at a high position in the radial direction is too large. Accordingly, the surfaces of the resin lens PL significantly vary in response to temperature variations and moisture absorption, and the optical performance is degraded. When the value of Inequality (1) is above the upper limit, the optical performance significantly varies due to variations in the surfaces of the resin lens PL when the temperature or humidity varies.

Inequality (2) defines a range of the Abbe number of the resin lens PL. When Inequality (2) is satisfied, the chromatic aberration can be reduced. When the value of Inequality (2) is below the lower limit, the dispersion of the resin lens PL is increased. When the resin lens PL has an aspheric shape, the chromatic spherical aberration and the chromatic field curvature are increased. When the value of Inequality (2) is above the upper limit, the axial chromatic aberration and the lateral chromatic aberration cannot be corrected.

Inequality (3) defines a range of the partial dispersion ratio of the resin lens PL. When Inequality (3) is satisfied, the effect of correcting the chromatic aberration can be obtained when the resin lens PL has an aspheric shape.

When the value of Inequality (3) is below the lower limit, the effect of chromatic aberration correction provided by the resin lens PL is reduced at the short-wavelength side (blue side), and the secondary chromatic aberration is likely to be insufficiently corrected. When the value of Inequality (3) is above the upper limit, the partial dispersion ratio of the resin lens PL is increased, and the secondary chromatic aberration is excessively corrected.

According to the above-described structure, a small, lightweight, high-performance optical system can be realized.

Preferably, at least one of the upper and lower limits of the numerical range of any of Inequalities (1), (2), and (3) is changed as in Inequalities (1a), (2a), and (3a):

$$1.950<Nd+(0.014\times\nu d)<2.040 \quad (1a)$$

$$30.2<\nu d<34.5 \quad (2a)$$

$$0.6400<\theta gF+(0.0024\times\nu d)<0.6850 \quad (3a)$$

More preferably, at least one of the upper and lower limits of the numerical range of any of Inequalities (1), (2), and (3) is changed as in Inequalities (1b), (2b), and (3b):

$$2.000<Nd+(0.014\times\nu d)<2.035 \quad (1b)$$

$$30.4<\nu d<34.0 \quad (2b)$$

$$0.6600<\theta gF+(0.0024\times\nu d)<0.6800 \quad (3b)$$

The structure of the optical system L0 according to each embodiment will now be described.

The resin from which the resin lens PL is formed can be a photocurable resin. When a photocurable resin is used, the resin lens PL can be formed on the glass lens L at a lower temperature compared to when a thermosetting resin is used. Therefore, the resin lens PL is not easily deformed and can be formed in a desired shape, so that the optical system L0 can have a high optical performance.

The composite optical elements HB1, HB2, HB3, and HB4 can be disposed on the image side of a lens closest to the object side in the optical system L0. The photocurable resin tends to have a low light stability due to the influence of a photopolymerization initiator, and the transmittance thereof at the short-wavelength side (blue side) is easily reduced due to yellowing caused by exposure to strong light for a long time.

When the transmittance at the short-wavelength side (blue side) is reduced, color reproducibility for the object is reduced. To obtain an imaging optical system having stable color reproducibility for a long period of time, a glass lens can be disposed on the object side of the composite optical elements HB1, HB2, HB3, and HB4 to reduce yellowing.

The optical system L0 includes a front group, an aperture stop, and a rear group arranged in that order from the object side, and one or more of the composite optical elements HB1, HB2, HB3, and HB4 can be included in the front group. When one or more of the composite optical elements HB1, HB2, HB3, and HB4 is included in the front group, the aberrations can be appropriately corrected.

Inequalities that can be satisfied by the optical system L0 of each embodiment will now be described.

The optical system L0 of each embodiment can satisfy one or more of the following inequalities:

$$1.0<T\max/T\min<10.0 \quad (4)$$

$$3<Tg/Tp<200 \quad (5)$$

$$|fg/fp|<0.30 \quad (6)$$

$$\beta<7.5\ [\%] \quad (7)$$

$$60\times10^{-6}<\alpha<100\times10^{-6}\ [1/^\circ\ \mathrm{C.}] \quad (8)$$

$$0.98<Ndg/Nd<1.4 \quad (9)$$

$$35.0<\nu dg<100.0 \quad (10)$$

$$\alpha w<0.50\ [\%] \quad (11)$$

Here, Tmax and Tmin are respectively the maximum thickness and the minimum thickness of the resin lens PL in the direction of the optical axis within the effective diameter, Tg is the thickness of the glass lens L along the optical axis, Tp is the thickness of the resin lens PL along the optical axis, fg is the focal length of the glass lens L, and fp is the focal length of the resin lens PL.

In addition, β is a curing shrinkage ratio of the resin lens PL. The curing shrinkage ratio is defined as follows:

Curing Shrinkage Ratio (%)=100×(specific gravity after curing−specific gravity before curing)/specific gravity after curing.

In addition, α is the coefficient of linear expansion of the resin lens PL, Ndg is the refractive index of the glass lens L, Nd is the refractive index of the resin lens PL, and νdg is the Abbe number of the glass lens PL.

In addition, αw is a hygroscopic expansion ratio of the resin lens PL. The hygroscopic expansion ratio is defined as follows:

Hygroscopic Expansion Ratio (%)=100×(thickness after hygroscopic expansion−thickness before hygroscopic expansion)/thickness after hygroscopic expansion.

Thickness variations caused when the humidity is changed from 0% to 90% in an environment at 60° C. are evaluated by using a humidity-controlled thermomechanical analyzer (TMA) for the measurement.

Inequality (4) defines a range of the thickness of the resin lens PL in the direction of the optical axis. When the value of Inequality (4) is above the upper limit, the thickness deviation ratio of the resin lens PL is too high, and surfaces are easily deformed when the temperature or humidity varies. When the value of Inequality (4) is below the lower limit, the amount of asphericity is too small and the aberrations cannot be easily corrected.

Inequality (5) defines a range of the ratio between the thickness of the glass lens L and the thickness of the resin lens PL along the optical axis. When the value of Inequality (5) is above the upper limit, the thickness of the resin lens PL is too small, and the desired amount of asphericity cannot be obtained. When the value of Inequality (5) is below the lower limit, the thickness of the resin lens PL is too large, and the transmittance at the short-wavelength side (blue side) is reduced.

Inequality (6) defines a range of the ratio between the focal length of the glass lens L and the focal length of the resin lens PL. When the value of Inequality (6) is above the upper limit, the refractive power of the resin lens PL is too strong, and surfaces are easily deformed when the temperature or humidity varies.

Inequality (7) defines a range of the curing shrinkage ratio of the resin lens PL. The photocurable resin is generally applied dropwise onto an aspherical mold and a base lens and placed along the aspherical mold, and then UV curing is performed. When the curing shrinkage ratio is large, the surface shapes change after the curing process, and the desired surface accuracy cannot be easily obtained.

When Inequality (7) is satisfied, the changes in shapes due to the curing process are reduced, and the surface accuracy can be increased.

Inequality (8) defines a range of the coefficient of linear expansion of the resin lens PL. When the value is above the upper limit, the surfaces of the resin lens PL are easily deformed in response to a temperature change. When the value is below the lower limit, the difference in coefficient of linear expansion between the glass lens L and the resin lens PL increases. As a result, stress applied to the joining surfaces increases, and the composite optical elements HB1, HB2, HB3, and HB4 easily break.

Inequality (9) defines a range of the ratio between the refractive index of the glass lens L and the refractive index of the resin lens PL. When the value of Inequality (9) is above the upper limit, the refractive index of the resin lens PL is too low and the curvature needs to be increased to obtain the desired refractive power. Accordingly, the surfaces are easily deformed when the temperature or humidity varies. When the value is below the lower limit, the refractive index of the glass lens L is too low, and the curvature needs to be increased to obtain the desired refractive power. As a result, the aberrations cannot be easily corrected.

Inequality (10) defines a range of the Abbe number of the glass lens L. When the value of Inequality (10) is above the upper limit, the difference in Abbe number between the resin lens PL and the glass lens L is too large, and the primary axial chromatic aberration and the primary lateral chromatic aberration are increased. When the value is below the lower limit, the Abbe number of the glass lens L is too small, and the partial dispersion ratio of the glass lens L is increased. Accordingly, the secondary axial chromatic aberration and the secondary lateral chromatic aberration are increased.

Inequality (11) defines a range of the hygroscopic expansion ratio of the resin lens PL. When the value of Inequality (11) is above the upper limit, the expansion of the resin lens PL due to moisture absorption is increased, and the surface shapes are significantly changed.

Preferably, at least one of the upper and lower limits of Inequalities (4) to (11) is set as in numerical ranges given below:

$$1.0<Tmax/Tmin<7.0 \quad (4a)$$

$$4<Tg/Tp<150 \quad (5a)$$

$$|fg/fp|<0.25 \quad (6a)$$

$$\beta<6.8\ [\%] \quad (7a)$$

$$65\times10^{-6}<\alpha<95\times10^{-6}\ [1/°\ C.] \quad (8a)$$

$$1.0<Ndg/Nd<1.3 \quad (9a)$$

$$37.5<\nu dg<80.0 \quad (10a)$$

$$\alpha w<0.45\ [\%] \quad (11a)$$

More preferably, at least one of the upper and lower limits of Inequalities (4) to (11) is set as in numerical ranges given below:

$$1.0<Tmax/Tmin<5.0 \quad (4b)$$

$$5<Tg/Tp<100 \quad (5b)$$

$$|fg/fp|<0.20 \quad (6b)$$

$$\beta<6.5\ [\%] \quad (7b)$$

$$70\times10^{-6}<\alpha<90\times10^{-6}\ [1/°\ C.] \quad (8b)$$

$$1.0<Ndg/Nd<1.2 \quad (9b)$$

$$40.0<\nu dg<60.0 \quad (10b)$$

$$\alpha w<0.40\ [\%] \quad (11b)$$

Detailed structures of the optical system L0 of each embodiment will now be described.

The materials of resin lenses PL1, PL11, PL12, and PL13 are material 1 shown in Table 1. The material of a resin lens PL2 is material 2 in Table 1. The materials of resin lenses PL3, PL31, and PL32 are material 3 in Table 1.

First Embodiment

The optical system L0 according to the first embodiment is a zoom lens including first to seventh lens units having positive, negative, positive, negative, positive, negative, and positive refractive powers and arranged in that order from the object side to the image side. During zooming, the intervals between the lens units vary. Since the first lens unit has a positive refractive power, the principal point can be disposed on the object side, and the overall length of the lenses in the optical system L0 can be reduced as a result. The second lens unit has a negative refractive power, and the interval between the first and second lens units is increased to change the magnification. The third and following lens units include lens units having a positive refractive power and lens units having a negative refractive power, so that variations in the aberrations that occur during zooming can be reduced.

The fourth lens unit moves during focusing so that high-speed focusing can be performed.

In the embodiments, the materials of the resin lenses PL included in the composite optical elements HB1, HB2, HB3, and HB4 are the materials shown in Table 1. Here, material 1 has a higher dispersion and a higher partial dispersion ratio than those of material 2. Material 2 has a higher dispersion and a higher partial dispersion ratio than those of material 3.

In the optical system L0 according to the first embodiment, a resin lens PL1 is disposed on the object side of a glass lens L41. The resin lens PL1 has a positive refractive power, the glass lens L41 has a negative refractive power, and the fourth lens unit has a negative refractive power. Since the resin lens PL1 is formed of material 1 having a high dispersion, the chromatic aberration generated in the fourth lens unit can be reduced. In addition, the resin lens PL1 has an aspheric shape, so that the spherical aberration at the telephoto end, in particular, can be corrected.

Since the resin lens PL1 is included in the fourth lens unit, the aberrations that vary during focusing can be reduced.

A resin lens PL3 is disposed on the object side of a glass lens L21. The resin lens PL3 has a positive refractive power, so that the lateral chromatic aberration generated in the second lens unit, in particular, can be reduced. In addition, the resin lens PL3 has an aspheric shape, so that distortion at the wide-angle end, in particular, can be corrected.

Second Embodiment

The optical system L0 according to the second embodiment is a zoom lens including first to fourth lens units having negative, positive, negative, and positive refractive powers and arranged in that order from the object side to the image side. During zooming, the intervals between the lens units vary. Since the first lens unit has a negative refractive power, the diameter of the first lens unit can be reduced in a wide-angle zoom lens. Since the second lens unit has a positive refractive power, the diameters of the lens units disposed on the image side of the second lens unit can be reduced. The third lens unit moves during focusing, so that high-speed focusing speed can be performed. Since the fourth lens unit has a positive refractive power, the principal point of the optical system L0 can be disposed on the image side, and a desired back focal length can be obtained.

A resin lens PL2 is disposed on the object side of a glass lens L12. The resin lens PL2 has an aspheric shape and is included in the first lens unit, so that the distortion at the wide-angle end, in particular, can be corrected.

A resin lens PL3 is disposed on the object side of a glass lens L21. The resin lens PL3 has a negative refractive power, so that the axial chromatic aberration generated in the second lens unit, in particular, can be corrected. In addition, the resin lens PL3 has an aspheric shape, so that the spherical aberration at the telephoto end, in particular, can be corrected.

A resin lens PL1 is disposed on the object side of a glass lens L31. The resin lens PL1 has an aspheric shape and is included in the third lens unit, so that the aberrations that vary during focusing can be reduced.

Third Embodiment

The optical system L0 according to the third embodiment is an optical system including first to fourth lens units having positive, positive, positive, and negative refractive powers and arranged in that order from the object side to the image side. During focusing, the second lens unit and the third lens unit move in the direction of the optical axis along different loci. An aperture stop is included in the second lens unit, so that symmetry of the optical system is improved and the aberrations generated in the first to third lens units are reduced. The combined focal length of all of the lenses disposed on the object side of the aperture stop is positive, so that the diameter of the axial light incident on the lenses on the image side of the aperture stop is reduced, and the sizes of the lenses on the image side of the aperture stop are reduced. Since the fourth lens unit having a negative refractive power is provided, the principal point of the optical system L0 is disposed on the object side, and the size of the optical system L0 is reduced.

A resin lens PL1 is disposed on the object side of a glass lens L14. The resin lens PL1 has an aspheric shape and is included in the first lens unit, so that the spherical aberration and coma aberration, in particular, can be corrected.

A resin lens PL3 made of material 3 is disposed on the object side of a glass lens L31. The resin lens PL3 has an aspheric shape and is included in the third lens unit, so that the aberrations that vary during focusing can be reduced.

Fourth Embodiment

The optical system L0 according to the fourth embodiment is a zoom lens including first to seventh lens units having positive, negative, positive, positive, negative, negative, and positive refractive powers and arranged in that order from the object side to the image side. During zooming, the intervals between the lens units vary. During focusing, the fifth lens unit and the sixth lens unit move in the direction of the optical axis along different loci.

A resin lens PL31 is disposed on the object side of a glass lens L21. The resin lens PL31 has a positive refractive power and reduces, in particular, the lateral chromatic aberration generated in the second lens unit at the wide-angle end.

A resin lens PL1 is disposed on the object side of a glass lens L32. The resin lens PL1 has an aspheric shape and is included in the third lens unit, so that the spherical aberration at the wide-angle end, in particular, can be corrected.

A resin lens PL32 is disposed on the object side of a glass lens L61. The resin lens PL32 has an aspheric shape and is included in the sixth lens unit, so that the aberrations that vary during focusing can be reduced.

Fifth Embodiment

The optical system L0 according to the fifth embodiment is a zoom lens including first to seventh lens units having negative, positive, positive, negative, positive, negative, and positive refractive powers and arranged in that order from the object side to the image side. During zooming, the intervals between the lens units vary. During focusing, the fourth lens unit and the sixth lens unit move in the direction of the optical axis along different loci.

A resin lens PL31 is disposed on the object side of a glass lens L13. The resin lens PL31 has an aspheric shape and is included in the first lens unit, so that the distortion at the wide-angle end, in particular, can be corrected.

A resin lens PL11 is disposed on the object side of a glass lens L21. The resin lens PL11 has an aspheric shape and is included in the second lens unit, so that the spherical aberration at the wide-angle end, in particular, can be corrected.

A resin lens PL32 is disposed on the image side of a glass lens L51. The resin lens PL32 has a negative refractive power and reduces, in particular, the lateral chromatic aberration generated in the fifth lens unit at the wide-angle end.

A resin lens PL12 is disposed on the object side of a glass lens L61. The resin lens PL12 has an aspheric shape and is included in the sixth lens unit, so that the aberrations that vary during focusing can be reduced.

Sixth Embodiment

The optical system L0 according to the sixth embodiment is an optical system including first to fifth lens units having positive, negative, positive, negative, and positive refractive powers and arranged in that order from the object side to the image side. During focusing, the second lens unit and the fourth lens unit move in the direction of the optical axis. An aperture stop is included in the third lens unit, so that the size of the aperture stop can be reduced. The combined focal length of all of the lenses disposed on the object side of the aperture stop is positive, so that the diameter of the axial light incident on the lenses on the image side of the aperture stop is reduced, and the sizes of the lenses on the image side of the aperture stop are reduced. During focusing, the second lens unit may move while the fourth lens unit is stationary.

A resin lens PL11 is disposed on the object side of a glass lens L12. The resin lens PL11 on the glass lens L12 has an aspheric shape and is included in the first lens unit, so that the spherical aberration, in particular, can be corrected.

A resin lens PL12 is disposed on the image side of a glass lens L33. The resin lens PL12 has a negative refractive power and reduces, in particular, the axial chromatic aberration.

A resin lens PL13 is disposed on the object side of a glass lens L41. The resin lens PL13 has an aspheric shape and is included in the fourth lens unit, so that the aberrations that vary during focusing can be reduced.

Although the optical system L0 according to each of the first to sixth embodiments is structured such that some of the lenses included therein are the composite optical elements HB1, HB2, HB3, and HB4, the optical system L0 may be composed only of the composite optical elements HB1, HB2, HB3, and HB4.

The resin lens may include impurities as long as the main component thereof is resin. The glass lens may include impurities as long as the main component thereof is glass.

First to sixth numerical examples corresponding to the first to sixth embodiments will now be described.

In surface data of each numerical example, OBJ represents the object side. Also, d (mm) is the interval along the axis (distance along the optical axis) between the $m^{th}$ and $(m+1)^{th}$ surfaces, where m is the number of each surface counted from the light incident side.

BF represents the back focal length. The unit of the half angle of view is the degree. Materials 1 to 3 correspond to materials 1 to 3 shown in Table 1.

The symbol '*' is attached to the right side of the surface number when the corresponding optical surface is an aspheric surface. When X is the displacement from the vertex of a surface in the direction of the optical axis, h is the height from the optical axis in a direction perpendicular to the optical axis, r is the paraxial radius of curvature, K is the conic constant, and A, B, C, D, E, and F are aspheric coefficients of the respective orders, an aspheric shape can be represented by the following equation:

$$x=(h^2/r)/[1+\{1-(1+K)(h/r)^2\}^{1/2}]+A\times h^4+B\times h^6+C\times h^8+D\times h^{10}+E\times h^{12}+F\times h^{14}$$

For each of the aspheric coefficients, "e±XX" means "×10±XX".

First Numerical Example

Unit of Measure mm

| Unit | Surface Number | Effective Diameter | Radius of Curvature | d | Material | Nd | νd |
|---|---|---|---|---|---|---|---|
| | OBJ | | | | | | |
| 1 | 1 | 56.22 | 109.5582 | 1.2000 | EFDS1W | 1.92286 | 20.88 |
| | 2 | 52.19 | 58.8628 | 8.0000 | SLAH66 | 1.77250 | 49.60 |
| | 3 | 50.51 | −807.8867 | (1.2000) | | | |
| 2 | 4* | 32.63 | 46.3012 | 0.1200 | 'Material 3' | 1.57844 | 32.31 |
| | 5 | 32.32 | 48.5957 | 1.0000 | SNBM51 | 1.61340 | 44.27 |
| | 6 | 24.49 | 15.6877 | 7.5400 | | | |
| | 7 | 24.24 | −49.7225 | 0.8000 | SLAL7Q | 1.65160 | 58.54 |
| | 8 | 21.79 | 26.1985 | 0.3000 | | | |
| | 9 | 21.71 | 25.3957 | 4.3000 | SNBH56 | 1.85478 | 24.80 |
| | 10 | 20.99 | −162.7544 | 1.3500 | | | |
| | 11 | 20.88 | −35.0984 | 0.8000 | SLAH66 | 1.77250 | 49.60 |
| | 12 | 20.45 | −264.6203 | (14.7183) | | | |
| 3 | 13 | 18.87 | 34.4152 | 3.7500 | SBSM16 | 1.62041 | 60.29 |
| | 14 | 18.90 | −47.7999 | (4.4290) | | | |

-continued

| Unit of Measure mm | | | | | | | |
|---|---|---|---|---|---|---|---|
| 4 | 15* | 18.35 | −28.2385 | 0.1000 | ‘Material 1’ | 1.58946 | 30.62 |
| | 16 | 18.36 | −28.1648 | 0.8000 | SLAH66 | 1.77250 | 49.60 |
| | 17 | 19.09 | 85.3680 | (2.9280) | | | |
| 5 | s18 | 11.14 | Infinity | 0.3000 | | | |
| | 19 | 21.56 | 21.6525 | 6.3000 | SFPL51 | 1.49700 | 81.54 |
| | 20 | 21.56 | −41.4868 | 0.8000 | SNBH56 | 1.85478 | 24.80 |
| | 21 | 21.70 | −73.4806 | 0.3000 | | | |
| | 22 | 21.44 | 20.8538 | 5.9000 | SFPL51 | 1.49700 | 81.54 |
| | 23 | 20.60 | −57.2878 | (1.6973) | | | |
| 6 | 24 | 19.03 | −32.8448 | 2.5000 | EFDS1W | 1.92286 | 20.88 |
| | 25 | 18.92 | −24.6748 | 0.8000 | NBFD29 | 1.77047 | 29.74 |
| | 26 | 18.57 | 520.0360 | (1.8567) | | | |
| 7 | 27 | 18.41 | 21.7440 | 2.7500 | SLAH51 | 1.78590 | 44.20 |
| | 28 | 18.02 | 44.4433 | 1.9000 | | | |
| | 29* | 18.03 | 60.3557 | 1.2000 | SLAH65V | 1.80400 | 46.58 |
| | 30* | 18.08 | 50.2598 | 6.7137 | | | |
| | 31 | 19.04 | −14.0878 | 1.2000 | SFPM5 | 1.55200 | 70.70 |
| | 32 | 20.94 | −21.4012 | (20.4643) | | | |
| | IMG | | | | | | |

Aspheric Surface Data

Surface 4 r = 4.63012e+01 K = 0.00000e+00 A = −1.22410e−06 B = −1.69358e−09
C = −5.41969e−11 D = 1.88636e−13 E = −3.12307e−16 F = 0.00000e+00

Surface 15 r = −2.82385e+01 K = 0.00000e+00 A = 1.32862e−06 B = 1.95072e−09
C = −4.31354e−11 D = 5.25362e−13 E = −7.48925e−15 F = 0.00000e+00

Surface 29 r = 6.03557e+01 K = 0.00000e+00 A = −5.44960e−05 B = −7.47516e−08
C = 1.76609e−09 D = −8.16025e−12 E = 0.00000e+00 F = 0.00000e+00

Surface 30 r = 5.02598e+01 K = 0.00000e+00 A = −5.26123e−07 B = −4.71521e−09
C = 1.67048e−09 D = −7.01370e−12 E = 0.00000e+00 F = 0.00000e+00

Various Data

| | Wide Angle | Intermediate | Telephoto |
|---|---|---|---|
| Focal Length | 24.60 | 35.00 | 67.90 |
| F-Number | 4.12 | 4.12 | 4.12 |
| Half Angle of View | 41.33 | 31.72 | 17.67 |
| Real Image Height | 19.39 | 21.41 | 21.64 |
| Overall Length | 108.50 | 114.20 | 142.13 |
| BF | 20.95 | 29.00 | 50.49 |

| Interval Data | Wide Angle | Intermediate | Telephoto | Wide Angle Close-Up | Intermediate Close-Up | Telephoto Close-Up |
|---|---|---|---|---|---|---|
| d0 | Infinity | Infinity | Infinity | 190.0037 | 184.3079 | 156.3736 |
| d3 | 1.2000 | 6.2051 | 19.6195 | | | |
| d12 | 14.7183 | 7.5639 | 1.0000 | | | |
| d14 | 4.4290 | 4.6576 | 6.2219 | 2.1300 | 2.3769 | 3.5021 |
| d17 | 2.9280 | 2.6994 | 1.1351 | 5.2371 | 5.0005 | 4.0747 |
| d23 | 1.6973 | 1.9626 | 2.3469 | | | |
| d26 | 1.8567 | 1.3851 | 0.5926 | | | |
| d32 | 20.4643 | 28.5451 | 49.9385 | | | |

Unit Data

| Unit | Start Surface | Focal Length |
|---|---|---|
| B1 | 1 | 146.8806 |
| B2 | 4 | −20.7586 |
| B3 | 13 | 32.8245 |
| B4 | 15 | −27.3564 |
| B5 | 18 | 18.9031 |
| B6 | 24 | −43.0176 |
| B7 | 27 | 137.0246 |

Second Numerical Example

| Unit of Measure mm | | | | | | | |
|---|---|---|---|---|---|---|---|
| Unit | Surface Number | Effective Diameter | Radius of Curvature | d | Material | Nd | vd |
| | OBJ | | | | | | |
| 1 | 1 | 26.90 | 41.7026 | 1.2000 | SBSM16 | 1.62041 | 60.29 |
| | 2 | 21.40 | 13.4105 | 8.0000 | | | |
| | 3* | 20.50 | −39.5335 | 0.1000 | ‘Material 2’ | 1.58212 | 31.72 |
| | 4 | 20.48 | −39.9499 | 1.0000 | SLAL12Q | 1.67790 | 55.35 |
| | 5 | 20.02 | 55.5002 | 0.4650 | | | |
| | 6 | 20.04 | 29.4638 | 2.3500 | STIH53 | 1.84666 | 23.78 |
| | 7 | 19.66 | 82.0347 | (24.7972) | | | |
| 2 | 8* | 16.66 | 25.2835 | 0.1000 | ‘Material 3’ | 1.57844 | 32.31 |
| | 9 | 16.64 | 26.2340 | 2.8000 | SLAL14 | 1.69680 | 55.53 |
| | 10 | 16.55 | −185.6544 | 0.3000 | | | |
| | 11 | 16.28 | 20.2547 | 3.9000 | SFPL51 | 1.49700 | 81.54 |
| | 12 | 15.91 | −31.0915 | 0.6000 | STIM22 | 1.64769 | 33.79 |
| | 13 | 15.58 | −115.4026 | 1.5000 | | | |
| | s14 | 7.51 | Infinity | 1.5000 | | | |
| | 15 | 13.89 | 50.0711 | 0.6000 | NBFD29 | 1.77047 | 29.74 |
| | 16 | 13.19 | 12.8607 | 1.6000 | | | |
| | 17 | 13.44 | 21.4799 | 2.7500 | SLAL14 | 1.69680 | 55.53 |
| | 18 | 13.32 | −49.7270 | (1.5000) | | | |
| 3 | 19* | 11.05 | −235.5077 | 0.1000 | ‘Material 1’ | 1.58946 | 30.62 |
| | 20 | 11.07 | −195.1432 | 0.6000 | SBSM16 | 1.62041 | 60.29 |
| | 21 | 11.35 | 18.6696 | (6.0712) | | | |
| 4 | 22 | 24.55 | 683.9337 | 4.0000 | SBSM15 | 1.62299 | 58.16 |
| | 23 | 25.00 | −29.0368 | 17.6666 | | | |
| | IMG | | | | | | |

Aspheric Shape

Surface 3 r = −3.95335e+01 K = 0.00000e+00 A = 3.72175e−06 B = −3.62012e−08
C = 2.89635e−10 D = −1.85987e−12 E = 4.91437e−15 F = 0.00000e+00

Surface 8 r = 2.52835e+01 K = 0.00000e+00 A = −2.21536e−05 B = 7.40283e−08
C = −9.30185e−10 D = 4.69479e−12 E = 0.00000e+00 F = 0.00000e+00

Surface 19 r = −2.35508e+02 K = 0.00000e+00 A = −2.22656e−05 B = 8.28531e−08
C = 7.05625e−09 D = −9.52391e−11 E = 0.00000e+00 F = 0.00000e+00

Various Data

| | Wide Angle | Intermediate | Telephoto |
|---|---|---|---|
| Focal Length | 15.30 | 30.00 | 45.00 |
| F-Number | 4.12 | 4.12 | 4.12 |
| Half Angle of View | 41.68 | 24.91 | 16.51 |
| Real Image Height | 11.60 | 13.65 | 13.65 |
| Overall Length | 83.50 | 83.50 | 83.50 |
| BF | 17.67 | 17.67 | 17.67 |

| Interval Data | Wide Angle | Intermediate | Telephoto | Wide Angle Close-Up | Intermediate Close-Up | Telephoto Close-Up |
|---|---|---|---|---|---|---|
| d0 | Infinity | Infinity | Infinity | 215.0042 | 215.0040 | 215.0175 |
| d18 | 1.5000 | 5.6039 | 12.7178 | 2.1066 | 7.2481 | 16.5410 |
| d21 | 6.0712 | 17.8923 | 18.6010 | 5.4947 | 16.3474 | 14.9773 |

Unit Data

| Unit | Start Surface | Focal Length |
|---|---|---|
| B1 | 1 | −22.7329 |
| B2 | 8 | 18.8764 |
| B3 | 19 | −27.8314 |
| B4 | 22 | 44.8069 |

Third Numerical Example

| Unit of Measure mm | | | | | | | |
|---|---|---|---|---|---|---|---|
| Unit | Surface Number | Effective Diameter | Radius of Curvature | d | Material | Nd | νd |
| | OBJ | | | | | | |
| 1 | 1 | 37.13 | −71.3044 | 1.0000 | STIM8 | 1.59551 | 39.24 |
| | 2 | 37.18 | 99.3313 | 3.8633 | | | |
| | 3 | 37.51 | −159.2435 | 8.0103 | SLAH96 | 1.76385 | 48.49 |
| | 4 | 38.18 | −30.1079 | 1.2000 | NBFD29 | 1.77047 | 29.74 |
| | 5 | 40.98 | 172.6911 | 0.2000 | | | |
| | 6* | 43.77 | 60.8144 | 0.1500 | 'Material 1' | 1.58946 | 30.62 |
| | 7 | 43.83 | 65.3234 | 8.1487 | SLAH52Q | 1.79952 | 42.24 |
| | 8 | 44.23 | −119.5223 | 0.1000 | | | |
| | 9 | 44.26 | −2096.0460 | 3.7235 | SNPH4 | 1.89286 | 20.36 |
| | 10 | 44.30 | −121.2291 | (7.5675) | | | |
| 2 | 11 | 39.91 | 43.2649 | 4.2677 | TAFD55W | 2.00100 | 29.13 |
| | 12 | 38.65 | 78.6856 | 3.9101 | | | |
| | s13 | 37.41 | Infinity | 7.7477 | | | |
| | 14 | 33.19 | −53.8580 | 1.0000 | SNBH8 | 1.72047 | 34.71 |
| | 15 | 32.07 | 32.3216 | 5.6097 | SFPL55 | 1.43875 | 94.66 |
| | 16 | 32.17 | 288.2573 | 3.3230 | | | |
| | 17 | 33.06 | 41.2838 | 8.3078 | SFPM3 | 1.53775 | 74.70 |
| | 18 | 32.90 | −54.2552 | (8.5403) | | | |
| 3 | 19* | 33.48 | 130.3947 | 0.3000 | 'Material 3' | 1.57844 | 32.31 |
| | 20 | 33.51 | 572.6917 | 5.2480 | SLAH65V | 1.80400 | 46.58 |
| | 21 | 33.69 | −45.9119 | 1.2000 | STIM35 | 1.69895 | 30.13 |
| | 22 | 33.96 | −2124.8955 | (1.5000) | | | |
| 4 | 23 | 34.32 | −2142.3828 | 6.8998 | SLAH93 | 1.90525 | 35.04 |
| | 24 | 34.43 | −33.7063 | 1.2000 | STIM22 | 1.64769 | 33.79 |
| | 25 | 33.44 | 97.4899 | 5.7826 | | | |
| | 26* | 33.44 | −39.4877 | 1.2000 | SNSL3 | 1.51823 | 58.90 |
| | 27 | 35.27 | −620.6618 | 13.5127 | | | |
| | IMG | | | | | | |

Aspheric Surface Data

Surface 6 r = 6.08144e+01 K = 0.00000e+00 A = −1.54852e−06 B = 8.52924e−10
C = −3.40772e−12 D = 6.10886e−15 E = −4.28512e−18 F = 0.00000e+00

Surface 19 r = 1.30395e+02 K = 0.00000e+00 A = −8.23122e−06 B = −5.74189e−09
C = −6.80330e−12 D = −1.96932e−14 E = 2.97689e−17 F = 0.00000e+00

Surface 26 r = −3.94877e+01 K = 0.00000e+00 A = −5.42380e−06 B = 9.92989e−09
C = −1.59142e−11 D = −1.07744e−14 E = 0.00000e+00 F = 0.00000e+00

Various Data

| | |
|---|---|
| Focal Length | 50.03 |
| F-Number | 1.44 |
| Half Angle of View | 23.39 |
| Real Image Height | 21.64 |
| Overall Length | 113.51 |
| BF | 13.51 |

Interval Data

| | Object at Infinity | Distance 2 | Distance 3 |
|---|---|---|---|
| d0 | Infinity | 2382 | 282 |
| d11 | 7.5675 | 6.7335 | 1.0000 |
| d19 | 8.5403 | 8.5170 | 8.4611 |
| d23 | 1.5000 | 2.3576 | 8.1468 |

Unit Data

| Unit | Start Surface | Focal Length |
|---|---|---|
| B1 | 1 | 148.4010 |
| B2 | 11 | 86.5174 |
| B3 | 19 | 135.0250 |
| B4 | 23 | −86.3586 |

Fourth Numerical Example

| Unit of Measure mm | | | | | | | |
|---|---|---|---|---|---|---|---|
| Unit | Surface Number | Effective Diameter | Radius of Curvature | d | Material | Nd | vd |
| | OBJ | | | | | | |
| 1 | 1 | 58.29 | 87.9007 | 1.3000 | SLAH92 | 1.89190 | 37.13 |
| | 2 | 56.08 | 57.1735 | 8.1500 | SFPL51 | 1.49700 | 81.54 |
| | 3 | 55.14 | 317.6192 | 0.2000 | | | |
| | 4 | 52.73 | 73.7099 | 7.0000 | SFPM4 | 1.52841 | 76.45 |
| | 5 | 51.73 | −2592.2438 | 1.2000 | | | |
| 2 | 6* | 35.12 | 6227.6782 | 0.1000 | ‘Material 3’ | 1.57844 | 32.31 |
| | 7 | 34.98 | 482.5262 | 1.4000 | SLAH65V | 1.80400 | 46.58 |
| | 8 | 28.15 | 23.3149 | 7.4000 | | | |
| | 9 | 27.73 | −44.4217 | 1.2000 | SLAL7Q | 1.65160 | 58.54 |
| | 10 | 27.00 | 82.7114 | 0.9000 | | | |
| | 11 | 26.99 | 53.6451 | 4.8000 | SNBH56 | 1.85478 | 24.80 |
| | 12 | 26.51 | −83.7860 | 2.6700 | | | |
| | 13 | 26.21 | −27.5416 | 0.8000 | SLAL14 | 1.69680 | 55.53 |
| | 14 | 26.50 | −53.7315 | 34.1114 | | | |
| 3 | s15 | 23.27 | Infinity | 1.0000 | | | |
| | 16 | 24.92 | 29.4374 | 4.9000 | NBFD29 | 1.77047 | 29.74 |
| | 17 | 24.58 | −648.9230 | 0.2000 | | | |
| | 18* | 23.75 | 32.9912 | 0.1000 | ‘Material 1’ | 1.58946 | 30.62 |
| | 19 | 23.68 | 33.0662 | 5.0000 | FCD600 | 1.59410 | 60.47 |
| | 20 | 22.91 | −55.1172 | 0.8000 | TAFD55W | 2.00100 | 29.13 |
| | 21 | 22.11 | 70.6777 | 0.7000 | | | |
| | 22 | 21.61 | 27.7554 | 0.8000 | TAFD55W | 2.00100 | 29.13 |
| | 23 | 20.33 | 15.5132 | 5.2000 | FCD600 | 1.59410 | 60.47 |
| | 24 | 19.78 | 80.7859 | 0.3000 | | | |
| | 25 | 19.59 | 48.8358 | 0.8000 | SNBH56 | 1.85478 | 24.80 |
| | 26 | 18.96 | 22.7910 | 4.8253 | | | |
| 4 | 27* | 19.12 | 58.8973 | 2.1000 | SFPM3 | 1.53775 | 74.70 |
| | 28 | 19.14 | −180.8280 | 1.0500 | | | |
| | 29 | 19.13 | −42.0993 | 3.2500 | STIM25 | 1.67270 | 32.10 |
| | 30 | 19.33 | −16.5048 | 0.8000 | SLAH59 | 1.81600 | 46.62 |
| | 31 | 20.07 | −40.0327 | 0.2000 | | | |
| | 32 | 20.51 | 46.2730 | 4.7500 | SFPM3 | 1.53775 | 74.70 |
| | 33 | 20.66 | −34.1487 | 1.2000 | | | |
| 5 | 34 | 20.07 | 53.4258 | 2.5000 | STIH53 | 1.84666 | 23.78 |
| | 35 | 19.77 | −271.7993 | 0.8000 | SNBH8 | 1.72047 | 34.71 |
| | 36 | 19.06 | 22.1453 | 16.6976 | | | |
| 6 | 37* | 23.61 | −22.9947 | 0.2000 | ‘Material 3’ | 1.57844 | 32.31 |
| | 38 | 23.68 | −23.6455 | 1.0000 | SLAM3 | 1.71700 | 47.93 |
| | 39 | 25.84 | −83.7538 | 1.9331 | | | |
| 7 | 40 | 35.44 | −474.0650 | 3.8000 | TAFD37A | 1.90043 | 37.37 |
| | 41 | 36.00 | −64.5532 | 13.5000 | | | |
| | IMG | | | | | | |

Aspheric Surface Data

Surface 6 r = 6.22768e+03 K = 0.00000e+00 A = 3.18688e−06 B = −1.17842e−09
C = −3.03074e−13 D = 9.55414e−15 E = 0.00000e+00 F = 0.00000e+00

Surface 18 r = 3.29912e+01 K = 0.00000e+00 A = −3.03190e−06 B = −3.20647e−09
C = 5.27457e−13 D = 0.00000e+00 E = 0.00000e+00 F = 0.00000e+00

Surface 27 r = 5.88973e+01 K = 0.00000e+00 A = −1.37808e−05 B = −3.03143e−10
C = −4.04786e−12 D = −7.63644e−14 E = 0.00000e+00 F = 0.00000e+00

Surface 37 r = −2.29947e+01 K = 0.00000e+00 A = 6.43299e−06 B = 1.57962e−08
C = −6.68878e−11 D = 7.97465e−13 E = −2.33566e−15 F = 0.00000e+00

| | Wide Angle | Intermediate | Telephoto |
|---|---|---|---|
| Focal Length | 28.40 | 85.00 | 197.00 |
| F-Number | 2.90 | 4.76 | 5.70 |
| Half Angle of View | 37.30 | 14.28 | 6.27 |
| Real Image Height | 18.98 | 21.64 | 21.64 |
| Overall Length | 151.14 | 179.02 | 220.00 |
| BF | 13.50 | 27.15 | 47.04 |

-continued

| Unit of Measure mm | | | | | | |
|---|---|---|---|---|---|---|
| Interval Data | Wide Angle | Intermediate | Telephoto | Wide Angle Close-Up | Intermediate Close-Up | Telephoto Close-Up |
| d0 | Infinity | Infinity | Infinity | 348.8972 | 601.0150 | 559.9984 |
| d6 | 1.2000 | 23.7358 | 48.0319 | 1.2000 | 23.7358 | 48.0319 |
| d15 | 34.1114 | 10.2408 | 1.5000 | 34.1114 | 10.2408 | 1.5000 |
| d27 | 4.8253 | 4.0847 | 2.5631 | 4.8253 | 4.0847 | 2.5631 |
| d35 | 1.2000 | 4.7733 | 1.5000 | 1.5781 | 7.0147 | 9.9353 |
| d38 | 16.6976 | 15.9567 | 20.6014 | 18.0753 | 14.9210 | 13.4958 |
| d41 | 1.9331 | 15.4058 | 21.0974 | 0.3000 | 14.2698 | 19.9248 |
| d43 | 13.5000 | 27.1474 | 47.0460 | 13.5000 | 27.1474 | 47.0460 |

| Unit Data | | |
|---|---|---|
| Unit | Start Surface | Focal Length |
| B1 | 1 | 111.8515 |
| B2 | 7 | −22.4552 |
| B3 | 16 | 51.7920 |
| B4 | 28 | 29.3235 |
| B5 | 36 | −65.4137 |
| B6 | 39 | −44.8606 |
| B7 | 42 | 82.6293 |

Fifth Numerical Example

| Unit of Measure mm | | | | | | | |
|---|---|---|---|---|---|---|---|
| Unit | Surface Number | Effective Diameter | Radius of Curvature | d | Material | Nd | νd |
| | OBJ | | | | | | |
| 1 | 1 | 47.50 | 75.4202 | 1.5000 | SLAL14 | 1.69680 | 55.53 |
| | 2 | 38.06 | 24.0812 | 6.4000 | | | |
| | 3 | 38.30 | 72.4298 | 1.8000 | SFPM2 | 1.59522 | 67.73 |
| | 4 | 35.75 | 36.5684 | 9.1000 | | | |
| | 5* | 34.97 | −62.2582 | 0.1500 | ‘Material 3’ | 1.57844 | 32.31 |
| | 6 | 34.96 | −63.2735 | 1.4000 | SFPM2 | 1.59522 | 67.73 |
| | 7 | 34.89 | −1220.0808 | 0.3000 | | | |
| | 8 | 34.78 | 49.6025 | 3.3000 | SNBH56 | 1.85478 | 24.80 |
| | 9 | 34.34 | 107.2344 | 42.9312 | | | |
| 2 | 10* | 23.59 | 52.2174 | 0.1500 | ‘Material 1’ | 1.58946 | 30.62 |
| | 11 | 23.57 | 56.8208 | 3.0000 | SLAL14 | 1.69680 | 55.53 |
| | 12 | 23.46 | −179.1826 | 4.5979 | | | |
| 3 | 13 | 23.53 | 31.3366 | 4.8500 | SFPL55 | 1.43875 | 94.66 |
| | 14 | 23.21 | −64.8202 | 1.0000 | | | |
| | s15 | 17.46 | Infinity | 1.0000 | | | |
| | 16 | 21.05 | 35.5136 | 3.1000 | SFPL51 | 1.49700 | 81.54 |
| | 17 | 20.34 | −562.3608 | 1.0000 | STIH4 | 1.75520 | 27.51 |
| | 18 | 18.97 | 21.3655 | 5.1493 | | | |
| 4 | 19 | 18.98 | 38.0228 | 3.8000 | STIH53 | 1.84666 | 23.78 |
| | 20 | 18.65 | −37.5904 | 1.0000 | NBFD29 | 1.77047 | 29.74 |
| | 21 | 18.14 | 23.6218 | 3.9538 | | | |
| 5 | 22 | 19.37 | 35.5322 | 3.6500 | SFPM2 | 1.59522 | 67.73 |
| | 23 | 19.78 | −61.5322 | 0.1000 | ‘Material 3’ | 1.57844 | 32.31 |
| | 24* | 19.81 | −63.9501 | 1.2000 | | | |
| 6 | 25* | 22.74 | 71.3543 | 0.1000 | ‘Material 1’ | 1.58946 | 30.62 |
| | 26 | 22.75 | 69.1508 | 1.0000 | SBSM28 | 1.61772 | 49.81 |
| | 27 | 22.85 | 26.0982 | 4.6400 | | | |
| 7 | 28 | 35.56 | 409.5688 | 3.1000 | SBSM16 | 1.62041 | 60.29 |
| | 29 | 36.00 | −134.9423 | 21.430 | | | |
| | IMG | | | | | | |

Aspheric Surface Data

Surface 5 r = −6.22582e+01 K = 0.00000e+00 A = 9.42990e−08 B = −6.31667e−09
C = 4.68141e−11 D = −1.38137e−13 E = 1.52549e−16 F = 0.00000e+00

Surface 10 r = 5.22174e+01 K = 0.00000e+00 A = −8.11324e−06 B = −7.25252e−09
C = 4.88156e−11 D = −1.72295e−13 E = 0.00000e+00 F = 0.00000e+00

-continued

| Unit of Measure mm |
|---|
| Surface 24 |
| r = −6.39501e+01 K = 0.00000e+00 A = −2.52047e−06 B = −3.53338e−08 |
| C = 8.14520e−10 D = −7.50083e−12 E = 2.46233e−14 F = 0.00000e+00 |
| Surface 25 |
| r = 7.13543e+01 K = 0.00000e+00 A = −6.97393e−06 B = 2.38504e−08 |
| C = −1.74049e−10 D = 5.35161e−13 E = 0.00000e+00 F = 0.00000e+00 |

| | Wide Angle | Intermediate | Telephoto |
|---|---|---|---|
| Focal Length | 21.00 | 40.00 | 60.00 |
| F-number | 2.90 | 3.50 | 4.10 |
| Half Angle of View | 45.79 | 28.39 | 19.29 |
| Real Image Height | 18.37 | 21.62 | 21.62 |
| Overall Length | 135.70 | 120.59 | 126.50 |
| BF | 22.43 | 22.43 | 22.43 |

| Interval Data | Wide Angle | Intermediate | Telephoto | Wide Angle Close-Up | Intermediate Close-Up | Telephoto Close-Up |
|---|---|---|---|---|---|---|
| d0 | Infinity | Infinity | Infinity | 364 | 379 | 373 |
| d9 | 42.9312 | 11.3047 | 1.2000 | 42.9312 | 11.3047 | 1.2000 |
| d12 | 4.5979 | 3.3956 | 0.7525 | 4.5979 | 3.3956 | 0.7525 |
| d18 | 5.1493 | 1.7299 | 1.5986 | 7.0332 | 3.6315 | 3.6365 |
| d21 | 3.9538 | 7.3734 | 7.5043 | 2.0700 | 5.4721 | 5.4661 |
| d24 | 1.2000 | 9.4431 | 13.1223 | 2.0166 | 12.7062 | 18.9182 |
| d27 | 4.6400 | 14.2782 | 29.0936 | 3.8735 | 11.0850 | 23.3778 |

Unit Data

| Unit | Start Surface | Focal Length |
|---|---|---|
| B1 | 1 | −35.5880 |
| B2 | 10 | 58.9288 |
| B3 | 13 | 271.4136 |
| B4 | 19 | −154.4306 |
| B5 | 22 | 38.9067 |
| B6 | 25 | −67.2928 |
| B7 | 28 | 163.9594 |

Sixth Numerical Example

Unit of Measure mm

| Unit | Surface Number | Effective Diameter | Radius of Curvature | d | Material | Nd | νd |
|---|---|---|---|---|---|---|---|
| | OBJ | | | | | | |
| 1 | 1 | 136.00 | 344.3393 | 9.8500 | SBSM25 | 1.65844 | 50.88 |
| | 2 | 135.42 | 9919.9769 | 0.2000 | | | |
| | 3* | 132.15 | 181.3545 | 0.2000 | ‘Material 1’ | 1.51450 | 51.97 |
| | 4 | 132.09 | 185.9490 | 9.1000 | SFPL51 | 1.49700 | 81.54 |
| | 5 | 130.83 | 358.1698 | 125.1400 | | | |
| | 6 | 75.81 | 140.6255 | 5.2500 | FDS18W | 1.94595 | 17.98 |
| | 7 | 74.79 | 344.6495 | 1.0000 | | | |
| | 8 | 68.19 | 65.0400 | 12.6000 | CAF2 | 1.43384 | 95.16 |
| | 9 | 65.55 | 5892.6284 | 0.1500 | | | |
| | 10 | 64.10 | 477.7687 | 1.8500 | SNBH56 | 1.85478 | 24.80 |
| | 11 | 56.54 | 43.8041 | 13.6000 | SFPL55 | 1.43875 | 94.66 |
| | 12 | 55.00 | 1194.8566 | 10.0796 | | | |
| 2 | 13 | 45.00 | 158.5665 | 1.3500 | SNBH56 | 1.85478 | 24.80 |
| | 14 | 42.96 | 58.4684 | 32.8230 | | | |
| 3 | 15 | 33.69 | 1e+18 | 1.0000 | | | |
| | 16 | 32.98 | 115.2657 | 1.2000 | SLAL14 | 1.69680 | 55.53 |
| | 17 | 32.03 | 43.3861 | 6.0000 | SFPL55 | 1.43875 | 94.66 |
| | 18 | 31.52 | −248.0207 | 1.0000 | | | |
| | s19 | 30.90 | 1e+18 | 3.2700 | | | |
| | 20 | 29.85 | 107.3960 | 1.2000 | SLAH66 | 1.77250 | 49.60 |
| | 21 | 28.97 | 45.1591 | 0.1500 | ‘Material 1’ | 1.51450 | 51.97 |
| | 22* | 28.91 | 43.9923 | 3.2500 | | | |
| | 23 | 28.90 | −141.6322 | 1.2000 | SBAL35 | 1.58913 | 61.13 |
| | 24 | 28.96 | 52.9991 | 3.5000 | SNBH56 | 1.85478 | 24.80 |
| | 25 | 28.83 | 120.0135 | 1.2700 | | | |
| | 26 | 29.15 | 65.3167 | 12.0000 | STIH14 | 1.76182 | 26.52 |

-continued

| Unit of Measure mm | | | | | | | |
|---|---|---|---|---|---|---|---|
| | 27 | 29.29 | −63.2044 | 0.2000 | | | |
| 4 | 28 | 28.49 | Infinity | 1.6800 | | | |
| | 29* | 28.48 | −64.1888 | 0.1500 | 'Material 1' | 1.51450 | 51.97 |
| | 30 | 28.48 | −61.3546 | 1.0000 | SLAH65V | 1.80400 | 46.58 |
| | 31 | 28.81 | 442.1135 | 16.2110 | | | |
| 5 | 32 | 35.13 | 150.2757 | 8.7000 | — | 1.66565 | 35.63 |
| | 33 | 35.56 | −38.4438 | 1.4000 | SFPL55 | 1.43875 | 94.66 |
| | 34 | 35.44 | 35.3372 | 0.8600 | | | |
| | 35 | 35.99 | 35.4743 | 11.0000 | — | 1.66565 | 35.63 |
| | 36 | 35.44 | −55.7379 | 1.4000 | FDS18W | 1.94595 | 17.98 |
| | 37 | 35.18 | 123.2032 | 46.0663 | | | |
| | IMG | | | | | | |

Aspheric Surface Data

Surface 3 r = 1.81355e+02 K = 0.00000e+00 A = −1.20055e−08 B = −6.85436e−13
C = 3.59105e−19 D = −3.89407e−21 E = 0.00000e+00 F = 0.00000e+00

Surface 22 r = 4.39923e+01 K = 0.00000e+00 A = −5.82385e−08 B = −3.14565e−10
C = −6.48513e−13 D = 1.00609e−15 E = 0.00000e+00 F = 0.00000e+00

Surface 29 r = −6.41888e+01 K = 0.00000e+00 A = −4.67182e−07 B = −1.68166e−09
C = 9.63799e−12 D = −3.54032e−14 E = 4.56322e−17 F = 0.00000e+00

| | Object at Infinity | Distance 2 | Distance 3 |
|---|---|---|---|
| Focal Length | 390.03 | 375.86 | 275.02 |
| F-Number | 2.91 | 2.93 | 3.08 |
| Half Angle of View | 3.21 | 3.32 | 4.52 |
| Real Image Height | 21.84 | 21.83 | 21.72 |
| Overall Length | 347.00 | 347.00 | 347.00 |
| BF | 46.20 | 46.20 | 46.20 |

| Interval Data | | | |
|---|---|---|---|
| d0 | Infinity | 20000 | 2000 |
| d12 | 10.0796 | 11.8520 | 28.2638 |
| d14 | 32.8230 | 31.0506 | 14.6391 |
| d27 | 0.2000 | 0.6879 | 5.6778 |
| d31 | 16.2110 | 15.7232 | 10.7332 |

Unit Data

| Unit | Start Surface | Focal Length |
|---|---|---|
| B1 | 1 | 182.4861 |
| B2 | 13 | −109.0337 |
| B3 | 15 | 94.9652 |
| B4 | 28 | −68.6321 |
| B5 | 32 | 181.9574 |

Tables 1 to 3 below show various values of each embodiment.

TABLE 1

| Table 1 | | | | |
|---|---|---|---|---|
| | Wavelength nm | Material 1 | Material 2 | Material 3 |
| Refractive Index | 435.8 | 1.61480 | 1.60624 | 1.60194 |
| | 486.1 | 1.60321 | 1.59523 | 1.59122 |
| | 546.1 | 1.59402 | 1.58648 | 1.58269 |
| | 587.6 | 1.58946 | 1.58212 | 1.57844 |
| | 656.3 | 1.58396 | 1.57687 | 1.57332 |
| Abbe Number νd | | 30.62 | 31.72 | 32.31 |
| Partial Dispersion Ratio θgF | | 0.602 | 0.600 | 0.599 |

TABLE 2

| Table 2 | | | | |
|---|---|---|---|---|
| | Expression | Material 1 | Material 2 | Material 3 |
| Nd + (0.014 × νd) | (1) | 2.018 | 2.026 | 2.031 |
| Abbe Number νd | (2) | 30.62 | 31.72 | 32.31 |
| θgF + (0.0024 × νd) | (3) | 0.6756 | 0.6760 | 0.6763 |
| Hygroscopic Expansion Ratio αw | (11) | 0.170 | 0.311 | 0.361 |
| Curing Shrinkage Ratio β | (7) | 5.90 | 6.17 | 6.30 |
| Coefficient of Linear Expansion α | (8) | $74 \times 10^{-6}$ | $82 \times 10^{-6}$ | $86 \times 10^{-6}$ |

TABLE 3

| Table 3 | | | | | | | | |
|---|---|---|---|---|---|---|---|---|
| | Expression | First Embodiment PL3, L21 | First Embodiment PL1, L41 | Second Embodiment PL2, L12 | Second Embodiment PL3, L21 | Second Embodiment PL1, L31 | Third Embodiment PL1, L14 | Third Embodiment PL3, L31 |
| Tmax/Tmin | (4) | 2.62 | 1.14 | 1.04 | 1.04 | 1.04 | 2.10 | 4.73 |
| Tg/Tp | (5) | 8.33 | 8.00 | 10.00 | 6.00 | 6.00 | 54.32 | 17.49 |
| \|fg/fp\| | (6) | 0.023 | 0.002 | 0.005 | 0.029 | 0.014 | 0.036 | 0.182 |
| Ndg/Nd | (9) | 1.022 | 1.115 | 1.061 | 1.019 | 1.019 | 1.132 | 1.142 |
| vdg | (10) | 44.27 | 49.60 | 55.35 | 60.29 | 60.29 | 42.24 | 46.58 |
| Tmax | | 0.2208 | 0.1 | 0.1015 | 0.1014 | 0.1014 | 0.1903 | 0.3022 |
| Tmin | | 0.0842 | 0.0878 | 0.0974 | 0.0977 | 0.0977 | 0.0908 | 0.0639 |
| Tp | | 0.120 | 0.100 | 0.100 | 0.100 | 0.100 | 0.150 | 0.300 |
| Tg | | 1.000 | 0.800 | 1.000 | 0.600 | 0.600 | 8.149 | 5.248 |
| fp | | 1663.40 | 12177.64 | −7146.71 | 1161.63 | 1929.77 | 1476.44 | 291.81 |
| fg | | −38.21 | −27.33 | −34.12 | 33.17 | −27.44 | 53.89 | 53.07 |
| Nd | | 1.5784 | 1.5895 | 1.5821 | 1.5895 | 1.5895 | 1.5935 | 1.5822 |
| Ndg | | 1.6134 | 1.7725 | 1.6779 | 1.6204 | 1.6204 | 1.8036 | 1.8077 |
| vdg | | 44.27 | 49.60 | 55.35 | 60.29 | 60.29 | 42.24 | 46.58 |

TABLE 4

| Table 4 | | | | | | | | |
|---|---|---|---|---|---|---|---|---|
| | Expression | Fourth Embodiment PL31, L21 | Fourth Embodiment PL1, L32 | Fourth Embodiment PL32, L61 | Fifth Embodiment PL31, L13 | Fifth Embodiment PL11, L21 | Fifth Embodiment PL32, L51 | Fifth Embodiment PL12, L61 |
| Tmax/Tmin | (4) | 1.75 | 1.64 | 1.59 | 1.33 | 1.56 | 1.08 | 2.24 |
| Tg/Tp | (5) | 14.00 | 50.00 | 5.00 | 9.33 | 20.00 | 12.00 | 10.00 |
| \|fg/fp\| | (6) | 0.034 | 0.002 | 0.028 | 0.016 | 0.058 | 0.013 | 0.018 |
| vdg | (9) | 46.58 | 60.47 | 47.93 | 67.73 | 55.53 | 67.74 | 49.81 |
| Ndg/Nd | (10) | 1.143 | 1.003 | 1.088 | 1.011 | 1.068 | 1.011 | 1.018 |
| Tmax | | 0.1752 | 0.1637 | 0.2143 | 0.1989 | 0.2054 | 0.1079 | 0.224 |
| Tmin | | 0.1 | 0.0999 | 0.1351 | 0.15 | 0.1317 | 0.1 | 0.1 |
| Tp | | 0.100 | 0.100 | 0.200 | 0.150 | 0.150 | 0.100 | 0.100 |
| Tg | | 1.400 | 5.000 | 1.000 | 1.400 | 3.000 | 1.200 | 1.000 |
| fp | | −904.26 | 16524.1 | −1627.7 | −7091.2 | 1080.4 | −2856.7 | −3863.9 |
| fg | | −30.51 | 35.54 | −46.27 | −112.17 | 62.24 | 38.38 | −68.47 |
| Nd | | 1.5784 | 1.5895 | 1.5784 | 1.5784 | 1.5895 | 1.5784 | 1.5895 |
| Ndg | | 1.8040 | 1.5941 | 1.7170 | 1.5952 | 1.6968 | 1.5952 | 1.6177 |
| vdg | | 46.58 | 60.47 | 47.93 | 67.73 | 55.53 | 67.74 | 49.81 |

| | Expression | Sixth Embodiment PL11, L12 | Sixth Embodiment PL12, L33 | Sixth Embodiment PL13, L41 |
|---|---|---|---|---|
| Tmax/Tmin | (4) | 1.89 | 1.40 | 1.50 |
| Tg/Tp | (5) | 45.50 | 21.67 | 6.67 |
| \|fg/fp\| | (6) | 0.054 | 0.029 | 0.025 |
| vdg | (9) | 81.54 | 49.60 | 46.58 |
| Ndg/Nd | (10) | 0.988 | 1.170 | 1.191 |
| Tmax | | 0.2 | 0.2106 | 0.15 |
| Tmin | | 0.1059 | 0.15 | 0.1 |
| Tp | | 0.200 | 0.150 | 0.150 |
| Tg | | 9.100 | 3.250 | 1.000 |
| fp | | 14058.04 | −3460.52 | 2653.03 |
| fg | | 764.70 | −101.73 | −66.95 |
| Nd | | 1.5145 | 1.5145 | 1.5145 |
| Ndg | | 1.4970 | 1.7725 | 1.8040 |

Imaging Apparatus

Figure 13:
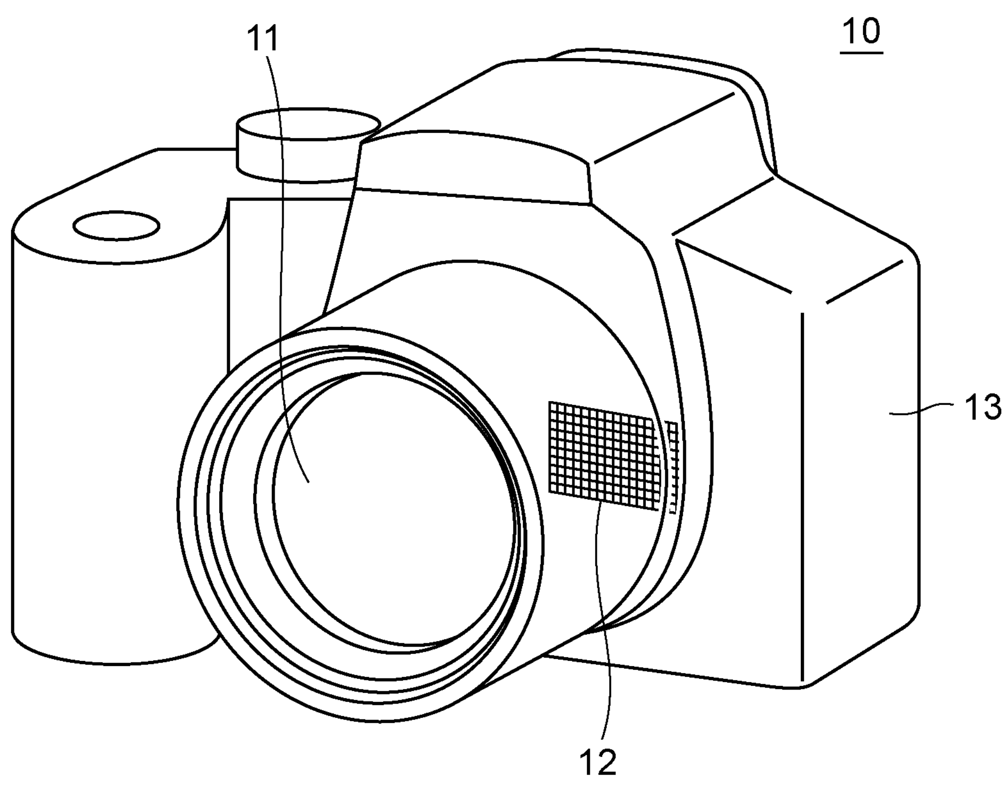
FIG. 13 is a schematic diagram illustrating an imaging apparatus.

An embodiment of a digital still camera (imaging apparatus) 10 including an optical system according to the present invention as an imaging optical system will be described with reference to FIG. 13. Referring to FIG. 13, an imaging optical system 11 is composed of an optical system according to any one of the first to sixth embodiments. An image pickup device (photoelectric transducer) 12, such as a CCD sensor or a CMOS sensor, is disposed in a camera body 13. The image pickup device 12 receives an optical image formed by the imaging optical system 11 and performs photoelectric conversion on the optical image. The camera body 13 may be a single-lens reflex camera including a quick return mirror or a mirrorless camera including no quick return mirror.

Thus, when the optical system L0 according to the present invention is applied to an imaging apparatus, such as a digital still camera, a high-resolution image with a wide angle of view can be obtained.

While the present invention has been described with reference to embodiments, it is to be understood that the invention is not limited to the disclosed embodiments but is determined by the scope of the following claims.

This application claims the benefit of Japanese Patent Application No. 2022-143624, filed Sep. 9, 2022, which is hereby incorporated by reference herein in its entirety.

What is claimed is:

1. An optical system comprising:
a composite optical element including a glass lens and a resin lens that are joined together,
wherein the resin lens has an aspheric shape,
wherein the optical system includes a first lens unit having a positive refractive power, a second lens unit having a negative refractive power, a third lens unit having a positive refractive power, and a rear group that are arranged in that order from an object side to an image side, the rear group including at least one lens unit,
wherein intervals between the lens units that are adjacent to each other vary during zooming,
wherein the composite optical element is disposed on the image side of the first lens unit, and
wherein, when Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900.$$

2. The optical system according to claim 1, wherein the composite optical element is disposed closest to the object side in the second lens unit.

3. The optical system according to claim 1, wherein the rear group includes a fourth lens unit disposed closest to the object side, and
wherein the composite optical element is included in the fourth lens unit.

4. An optical system according to claim 1 comprising:
a composite optical element including a glass lens and a resin lens that are joined together,
wherein the resin lens has an aspheric shape,
wherein the optical system includes a first lens unit having a negative refractive power, a second lens unit having a positive refractive power, and a rear group that are arranged in that order from an object side to an image side, the rear group including at least one lens unit,
wherein intervals between the lens units that are adjacent to each other vary during zooming, and
wherein the composite optical element is included in the first lens unit, and
wherein, when Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900.$$

5. An optical system, comprising:
a composite optical element including a glass lens and a resin lens that are joined together,
wherein the resin lens has an aspheric shape,
wherein the optical system includes a first lens unit having a negative refractive power, a second lens unit having a positive refractive power, and a rear group that are arranged in that order from an object side to an image side, the rear group including at least one lens unit,
wherein intervals between the lens units that are adjacent to each other vary during zooming, and
wherein the composite optical element is included in the second lens unit, and
wherein, when Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900.$$

6. An optical system comprising:
a composite optical element including a glass lens and a resin lens that are joined together,
wherein the resin lens has an aspheric shape,
wherein the optical system includes a first lens unit having a negative refractive power, a second lens unit having a positive refractive power, a third lens unit having a negative refractive power, and a rear group that are arranged in that order from an object side to an image side, the rear group including at least one lens unit,
wherein intervals between the lens units that are adjacent to each other vary during zooming,
wherein the composite optical element is included in the third lens unit, and
wherein, when Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900.$$

7. An imaging apparatus comprising:
an optical system; and
an image pickup device that receives an image formed by the optical system,
wherein the optical system includes:
a composite optical element including a glass lens and a resin lens that are joined together,
wherein the resin lens has an aspheric shape,
wherein the optical system includes a first lens unit having a positive refractive power, a second lens unit having a negative refractive power, a third lens unit having a positive refractive power, and a rear group that are arranged in that order from an object side to an image side, the rear group including at least one lens unit,
wherein intervals between the lens units that are adjacent to each other vary during zooming,
wherein the composite optical element is disposed on the image side of the first lens unit, and
wherein, when Nd is a refractive index of the resin lens, νd is an Abbe number of the resin lens, and θgF is a partial dispersion ratio of the resin lens, the following inequalities are satisfied:

$$1.900<Nd+(0.014\times\nu d)<2.045$$

$$30.0<\nu d<35.0$$

$$0.6200<\theta gF+(0.0024\times\nu d)<0.6900.$$

* * * * *